United States Patent
Do et al.

(10) Patent No.: US 11,111,318 B2
(45) Date of Patent: Sep. 7, 2021

(54) SILYL-BRIDGED BIS-BIPHENYL-PHENOXY CATALYSTS FOR OLEFIN POLYMERIZATION

(71) Applicant: Dow Global Technologies LLC, Midland, MI (US)

(72) Inventors: Hien Q. Do, Sugar Land, TX (US); Philip P. Fontaine, Pearland, TX (US); Andrew J. Young, Houston, TX (US); Susan G. Brown, Pearland, TX (US); Johnathan E. DeLorbe, Manvel, TX (US); Tulaza Vaidya, Royersford, PA (US); Zach T. Rickaway, Rosharon, TX (US); Amy E. Floeck (nee Duchnowski), Pearland, TX (US); Chunming Zhang, Zionsville, IN (US); Ruth Figueroa, Midland, MI (US); Jerzy Klosin, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 207 days.

(21) Appl. No.: 16/317,996

(22) PCT Filed: Jul. 28, 2017

(86) PCT No.: PCT/US2017/044338
§ 371 (c)(1),
(2) Date: Jan. 15, 2019

(87) PCT Pub. No.: WO2018/022975
PCT Pub. Date: Feb. 1, 2018

(65) Prior Publication Data
US 2020/0247917 A1    Aug. 6, 2020

Related U.S. Application Data

(60) Provisional application No. 62/368,706, filed on Jul. 29, 2016.

(51) Int. Cl.
*C08F 4/64* (2006.01)
*C08F 210/16* (2006.01)
*C08F 2/38* (2006.01)

(52) U.S. Cl.
CPC ............ *C08F 4/64193* (2013.01); *C08F 2/38* (2013.01); *C08F 210/16* (2013.01); *C08F 2500/12* (2013.01)

(58) Field of Classification Search
CPC ....................................................... C08F 4/64
See application file for complete search history.

(56) References Cited

U.S. PATENT DOCUMENTS 7,528,203 B2 * 5/2009 Leclerc ................ C08F 210/02
526/161
8,609,794 B2    12/2013 Klosin et al.
(Continued)

FOREIGN PATENT DOCUMENTS

WO    2005108406 A1    11/2005
WO    2007136493 A2    11/2007
(Continued)

OTHER PUBLICATIONS

SciFinder Search (Oct. 5, 2020).*
(Continued)

*Primary Examiner* — Vu A Nguyen
(74) *Attorney, Agent, or Firm* — Dinsmore & Shohl LLP

(57) ABSTRACT

Embodiments are directed to a metal complex formed, wherein the metal complexes are used as pro-catalyst in polyolefin polymerization and comprise the following structure (Formula (I)).

(Continued)

(I)

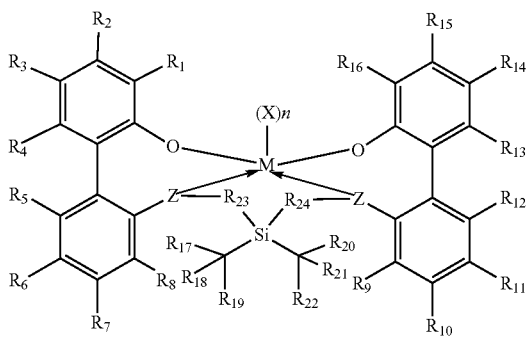

10 Claims, 2 Drawing Sheets

(56) References Cited

U.S. PATENT DOCUMENTS

| | | |
|---|---|---|
| 9,000,108 B2 | 4/2015 | Klosin et al. |
| 9,102,819 B2 | 4/2015 | Kapur et al. |
| 9,115,275 B2 | 8/2015 | Kupar et al. |
| 10,519,260 B2 * | 12/2019 | Fontaine ............... C08F 210/16 |
| 10,526,431 B2 * | 1/2020 | Fontaine ................... C07F 7/28 |
| 2011/0282018 A1 | 11/2011 | Klosin et al. |
| 2015/0337060 A1 | 11/2015 | Castro et al. |
| 2015/0337063 A1 | 11/2015 | Demirors et al. |

FOREIGN PATENT DOCUMENTS

| | | |
|---|---|---|
| WO | 2014105412 A1 | 7/2014 |
| WO | 2014105413 A1 | 7/2014 |
| WO | 2014210333 A1 | 12/2014 |
| WO | 2016003879 A1 | 1/2016 |
| WO | 2018022975 A1 | 2/2018 |

OTHER PUBLICATIONS

SciFinder Search (Dec. 18, 2020).*
Fineman, M. and Ross, S.D., "Linear Method for Determining Monomer Reactivity Ratios in Copolymerization," Journal of Polymer Science, vol. 5, No. 2, pp. 259-265 (Dec. 8, 1949).
Mayo, F. R. and Walling, C., "Copolymerization," Chem. Rev., vol. 6, pp. 191-287 (Jun. 25, 1949).
Monrabal, B., et al., "Crystallization Elution Fractionation. A New Separation Process for Polyolefin Resins," Macromol. Symp., vol. 257, pp. 71-79 (2007).
International Search Report and Written Opinion issued by the U.S. Patent and Trademark Office as International Searching Authority for International Application No. PCT/US2017/044338 dated Oct. 13, 2017 (10 pages).

* cited by examiner

SILYL-BRIDGED BIS-BIPHENYL-PHENOXY CATALYSTS FOR OLEFIN POLYMERIZATION

CROSS-REFERENCE TO RELATED APPLICATIONS

This application claims priority to U.S. Provisional Application, 62/368,706, filed Jul. 29, 2016, which is incorporated herein by reference in its entirety.

FIELD OF INVENTION

Embodiments of the present disclosure generally relate to the synthesis of silyl-bridged bis-biphenyl-phenoxy catalyst systems for olefin polymerization.

BACKGROUND OF THE INVENTION

Olefin based polymers such as polyethylene and/or polypropylene are produced via various catalyst systems. Selection of such catalyst systems used in the polymerization process of the olefin based polymers is an important factor contributing to the characteristics and properties of such olefin based polymers.

Polyethylene and polypropylene are manufactured for a wide variety of articles. The polyethylene and polypropylene polymerization process can be varied in a number of respects to produce a wide variety of resultant polyethylene resins having different physical properties that render the various resins suitable for use in different applications. The ethylene monomers and optionally one or more co-monomers are present in liquid diluents, such as an alkane or isoalkane, for example isobutane. Hydrogen may also be added to the reactor. The catalyst systems for producing polyethylene may typically comprise a chromium-based catalyst system, a Ziegler Natta catalyst system, and/or a molecular (either metallocene or non-metallocene) catalyst system. The reactants in the diluent and the catalyst system are circulated at an elevated polymerization temperature around the loop reactor thereby producing polyethylene homopolymer and/or copolymer depending on whether or not one or more co-monomers are present. Either periodically or continuously, part of the reaction mixture, including the polyethylene product dissolved in the diluent, together with unreacted ethylene and one or more optional co-monomers, is removed from the loop reactor. The reaction mixture when removed from the loop reactor may be processed to remove the polyethylene product from the diluent and the unreacted reactants, with the diluent and unreacted reactants typically being recycled back into the loop reactor. Alternatively, the reaction mixture may be sent to a second reactor, e.g. loop reactor, serially connected to the first loop reactor where a second polyethylene fraction may be produced.

SUMMARY OF THE INVENTION

Despite the search efforts in developing catalyst systems suitable for olefin polymerization, such as polyethylene or polypropylene polymerization, there is still a need for a pro-catalyst and a catalyst system exhibiting a higher efficiency than comparative catalyst systems; which are capable of producing polymers with a lower melt flow ratio ($I_{10}/I_2$) and a narrower molecular weight distribution (MWD).

One embodiment of this disclosure describes a metal ligand complex comprising a structure defined by formula (I):

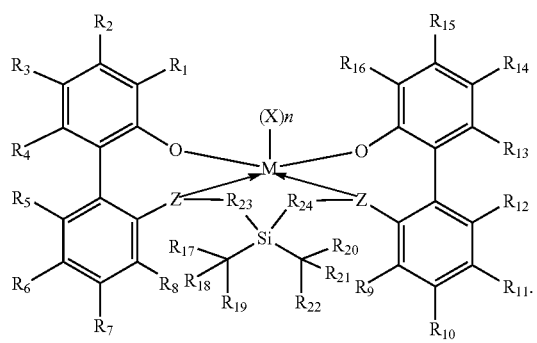

In some embodiments, M of formula (I) is titanium, zirconium, or hafnium, each independently being in a formal oxidation state of +2, +3, or +4. The n of $(X)_n$ is an integer of 0, 1, 2, or 3. When n is 0, X is absent. Each X independently is a monodentate ligand that is neutral, monoanionic, or dianionic; or two Xs are taken together to form a bidentate ligand that is neutral, monoanionic, or dianionic. X and n are chosen in such a way that the metal ligand complex of formula (I) is, overall, neutral. Each Z independently is O, S, N($C_1$-$C_{40}$)hydrocarbyl, or P($C_1$-$C_{40}$)hydrocarbyl.

In formula (I), $R^{1-7}$ and $R^{10-16}$ are selected from the group consisting of a ($C_1$-$C_{40}$)hydrocarbyl, ($C_1$-$C_{40}$)heterohydrocarbyl, Si($R^C$)$_3$, P($R^P$)$_2$, N($R^N$)$_2$, OR$^C$, SR$^C$, NO$_2$, CN, CF$_3$, R$^C$S(O)—, R$^C$S(O)$_2$—, (R$^C$)$_2$C=N—, R$^C$C(O)O—, R$^C$OC(O)—, R$^C$C(O)N(R)—, (R$^C$)$_2$NC(O)—, halogen atom, hydrogen atom, and combinations thereof, and wherein independently each $R^C$ is unsubstituted ($C_1$-$C_{18}$)hydrocarbyl, each $R^P$ is unsubstituted ($C_1$-$C_{18}$)hydrocarbyl, and each $R^N$ is unsubstituted ($C_1$-$C_{18}$)hydrocarbyl or absent. When $R^N$ is absent then N comprises —N=.

In some embodiments of formula (I), $R^8$ and $R^9$ are hydrogen atoms, $R^{23}$ and $R^{24}$ are independently selected from —(CR$^C_2$)$_m$—, wherein the m is an integer from 1 to 10. In some embodiments of formula (I), $R^{17-22}$ are independently selected from a hydrogen atom, a ($C_1$-$C_{40}$)hydrocarbyl, or two or more groups selected from $R^{17-22}$ can combine together into a ring structure, with such ring structures having from 3 to 50 atoms in the ring, excluding any hydrogen atoms. In one embodiment, the sum of the non-hydrogen atoms for $R^{17-19}$ is larger than 1, and/or the sum of the non-hydrogen atoms for $R^{20-22}$ is larger than 1.

At least $R^1$, $R^{16}$, or both comprise formula (II), formula (III), or formula (IV):

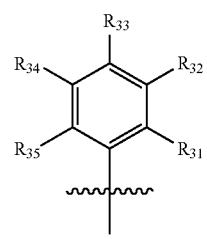

II

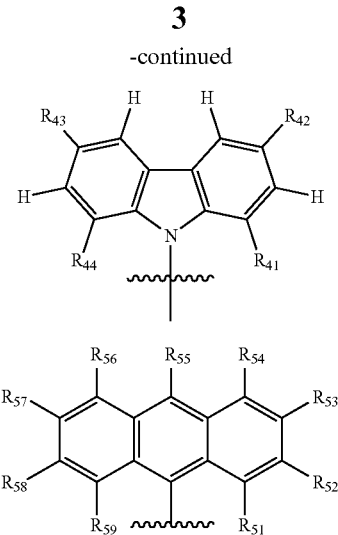

In some embodiments, $R^{31-35}$, $R^{41-44}$, and $R^{51-59}$ are independently chosen from a $(C_1-C_{40})$hydrocarbyl, $(C_1-C_{40})$heterohydrocarbyl, $Si(R^C)_3$, $P(R^P)_2$, $N(R^N)_2$, $OR^C$, $SR^C$, $NO_2$, $CN$, $CF_3$, $R^CS(O)—$, $R^CS(O)_2—$, $(R^C)_2C=N—$, $R^CC(O)O—$, $R^COC(O)—$, $R^CC(O)N(R)—$, $(R^C)_2NC(O)—$, halogen atom, hydrogen atom, and combinations thereof; and wherein independently each $R^C$ is unsubstituted $(C_1-C_{18})$hydrocarbyl, each $R^P$ is unsubstituted $(C_1-C_{18})$hydrocarbyl, and each $R^N$ is unsubstituted $(C_1-C_{18})$hydrocarbyl or absent. When $R^N$ is absent then N comprises $—N=$.

DETAILED DESCRIPTION OF THE INVENTION

Figure 1:
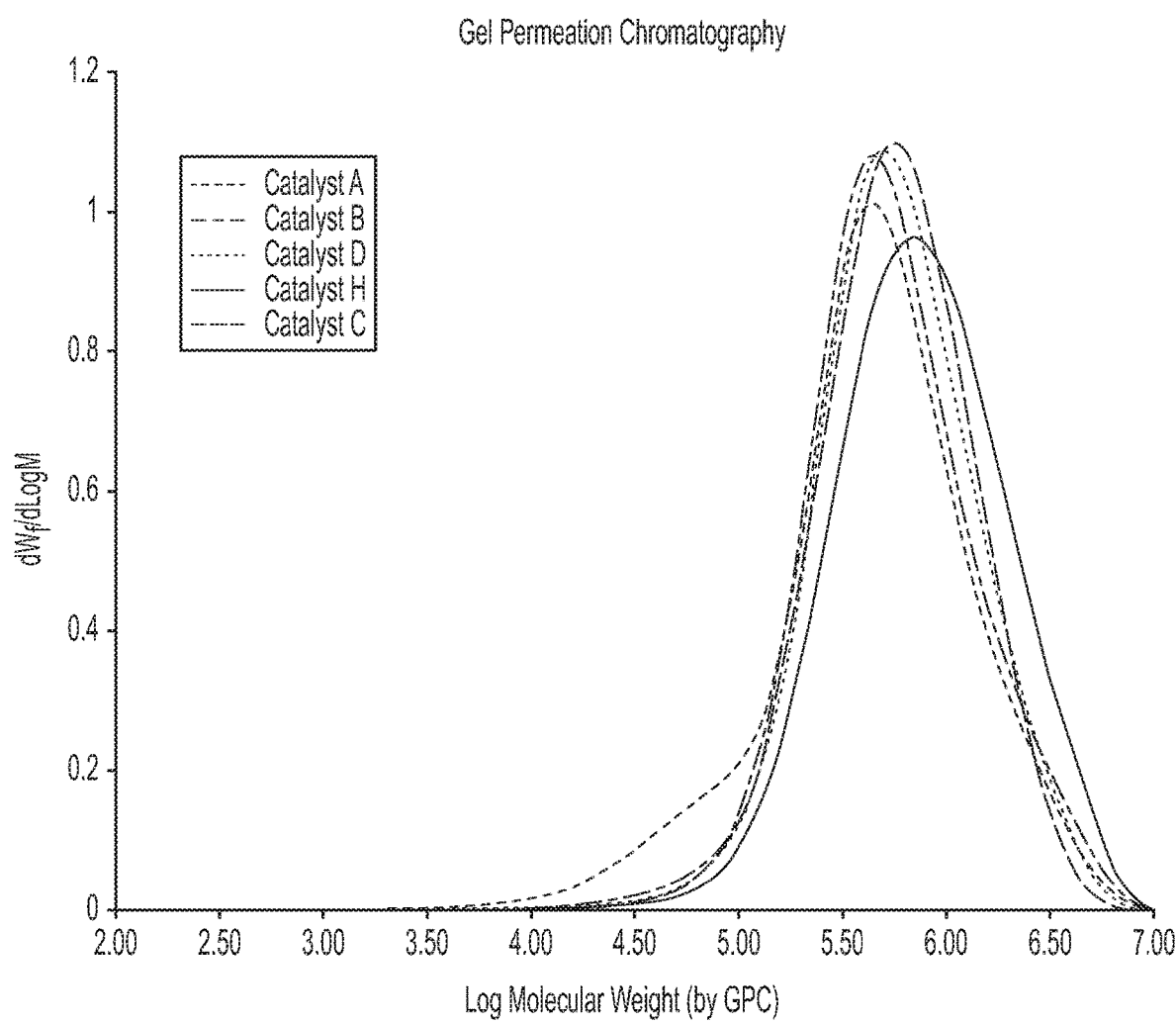
FIG. 1 is a graph of Gel Permeation Chromatography (GPC) results of a molecular weight distribution overlay from five polymers synthesized from five catalyst systems.

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

The term "independently selected" is used herein to indicate that the R groups, such as, $R^1$, $R^2$, $R^3$, $R^4$, and $R^5$ can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.). Use of the singular includes use of the plural and vice versa (e.g., a hexane solvent, includes hexanes). A named R group will generally have the structure that is recognized in the art as corresponding to R groups having that name. These definitions are intended to supplement and illustrate, not preclude, the definitions known to those of skill in the art.

The term "aliphatic" means a non-aromatic saturated or unsaturated straight or branched hydrocarbon radical of from 1 to 40 carbon atoms or from 1 to 18 carbon atoms.

By "substituted" as in "substituted aliphatic moiety," "substituted aryl," "substituted alkyl," and "substituted alkenyl," as alluded to in some of the aforementioned definitions, is meant that in the hydrocarbyl, hydrocarbylene, alkyl, alkenyl, aryl or other moiety, at least one hydrogen atom bound to a carbon atom is replaced with one or more substituents that are groups such as hydroxyl, alkoxy, alkylthio, amino, halo, and silyl, to name a few. When the term "substituted" appears prior to a list of possible substituted groups, it is intended that the term apply to every member of that group. That is, the phrase "substituted alkyl, alkenyl and alkynyl" is to be interpreted as "substituted alkyl, substituted alkenyl and substituted alkynyl." Similarly, "optionally substituted alkyl, alkenyl and alkynyl" is to be interpreted as "optionally substituted alkyl, optionally substituted alkenyl and optionally substituted alkynyl."

One embodiment of this disclosure describes a metal ligand complex comprising a structure defined by formula (I):

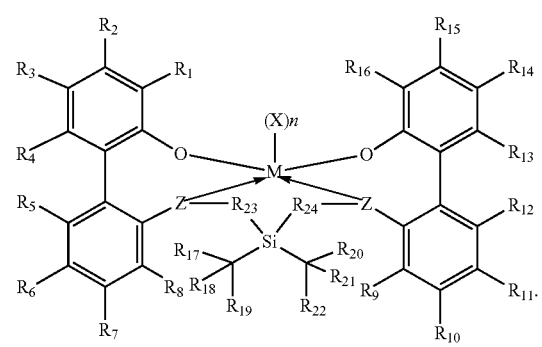

The M in the metal ligand complex of formula (I) may comprise transition metals, lanthanides, actinides, or Group 3 to Group 10 elements. In other embodiments, the M comprises a Group 4 element. In some embodiments, M of formula (I) is titanium (Ti), zirconium (Zr), or hafnium (Hf), each independently being in a formal oxidation state of +2, +3, or +4, and the n of $(X)_n$ is an integer of from 0, 1, 2, or 3.

In some embodiments, the X moieties form covalent bonds, dative bonds, ionic bonds, or combinations thereof with M. Each X independently is a monodentate ligand that is neutral, monoanionic, or dianionic; or two Xs are taken together to form a bidentate ligand that is neutral, monoanionic, or dianionic. X and n are chosen in such a way that the metal ligand complex of formula (I) is, overall, neutral. In one embodiment, when there are two or more X monodentate ligands, each X is the same. In some embodiments, the monodentate ligand is the monoanionic ligand. The monoanionic ligand has a net formal oxidation state of −1. Each monoanionic ligand may independently be hydride, $(C_1-C_{40})$hydrocarbyl carbanion, $(C_1-C_{40})$heterohydrocarbyl carbanion, halide, nitrate, carbonate, phosphate, sulfate, $HC(O)O^-$, $(C_1-C_{40})$hydrocarbylC(O)$O^-$, $HC(O)N(H)^-$, $(C_1-C_{40})$hydrocarbylC(O)N(H)$^-$, $(C_1-C_{40})$hydrocarbylC(O)N((C_1-C_{20})$hydrocarbyl)$^-$, $R^KR^LB^-$, $R^KR^LN^-$, $R^KO^-$, $R^KS^-$, $R^KR^LP^-$, or $R^MR^KR^LSi^-$, wherein each $R^K$, $R^L$, and $R^M$ independently is hydrogen, $(C_1-C_{40})$hydrocarbyl, or $(C_1-C_{40})$heterohydrocarbyl, or $R^K$ and $R^L$ are taken together to form a $(C_2-C_{40})$hydrocarbylene or $(C_1-C_{20})$heterohydrocarbylene and $R^M$ is as defined above.

In some embodiments, at least one monodentate ligand of X independently is the neutral ligand. In specific embodiment, the neutral ligand is a neutral Lewis base group that is $R^XNR^KR^L$, $R^KOR^L$, $R^KSR^L$, or $R^XPR^KR^L$, wherein each $R^X$ independently is hydrogen, $(C_1-C_{40})$hydrocarbyl, $[(C_1-C_{10})$hydrocarbyl$]_3$Si, $[(C_1-C_{10})$hydrocarbyl$]_3$Si$(C_1-C_{10})$hydrocarbyl, or $(C_1-C_{40})$heterohydrocarbyl and each $R_K$ and $R^L$ independently is as defined above.

In some embodiments, each X is a monodentate ligand that independently is a halogen atom, unsubstituted $(C_1-C_{20})$hydrocarbyl, unsubstituted $(C_1-C_{20})$hydrocarbylC(O)O—, or $R^KR^LN$—, wherein each of $R^K$ and $R^L$ independently is an unsubstituted $(C_1-C_{20})$hydrocarbyl. In some embodiments, each monodentate ligand X is a chlorine atom, $(C_1-C_{10})$hydrocarbyl (e.g., $(C_1-C_6)$alkyl or benzyl), unsubstituted $(C_1-C_{10})$hydrocarbylC(O)O—, or $R^KR^LN$—, wherein each of $R^K$ and $R^L$ independently is a unsubstituted $(C_1-C_{10})$ hydrocarbyl.

In some embodiments, there are at least two X and the two X are taken together to form the bidentate ligand. In a further embodiment, the bidentate ligand is a neutral bidentate ligand. In one embodiment, the neutral bidentate ligand is a diene of formula $(R^D)_2C=C(R^D)—C(R^D)=C(R^D)_2$, wherein each $R^D$ independently is H, unsubstituted $(C_1-C_6)$ alkyl, phenyl, or naphthyl. In some embodiments the bidentate ligand is a monoanionic-mono (Lewis base) ligand. In some embodiments, the bidentate ligand is a dianionic ligand. The dianionic ligand has a net formal oxidation state of −2. In one embodiment, each dianionic ligand independently is carbonate, oxalate (i.e., $^-$O2CC(O)O$^-$), $(C_2-C_{40})$ hydrocarbylene dicarbanion, $(C_1-C_{40})$heterohydrocarbylene dicarbanion, phosphate, or sulfate.

As previously mentioned, the number and charge (e.g. neutral, monoanionic, and dianionic) of X are selected depending on the formal oxidation state of M such that the metal ligand complex of formula (I) is, overall, neutral.

In further embodiments, X is selected from methyl; ethyl; 1-propyl; 2-propyl; 1-butyl; 2,2-dimethylpropyl; trimethylsilylmethyl; phenyl; benzyl; or chloro. In some embodiments n is 2 and each X is the same. In some instances, at least two X are different. In other embodiments n is 2 and each X is a different one of methyl; ethyl; 1-propyl; 2-propyl; 1-butyl; 2,2,-dimethylpropyl; trimethylsilylmethyl; phenyl; benzyl; and chloro. In one embodiment, n is 2 or 3 and at least two X independently are monoanionic monodentate ligands and a third X, if present, is a neutral monodentate ligand. In a specific embodiment, n is 2 and the two X groups are taken together to form a bidentate ligand. In further embodiments, the bidentate ligand is 2,2-dimethyl-2-silapropane-1,3-diyl or 1,3-butadiene.

The metal precursors may be monomeric, dimeric or higher orders thereof. Specific examples of suitable hafnium and zirconium precursors include, but are not limited to HfCl$_4$, HfMe$_4$, Hf(CH$_2$Ph)$_4$, Hf(CH$_2$CMe$_3$)$_4$, Hf(CH$_2$SiMe$_3$)$_4$, Hf(CH$_2$Ph)$_3$Cl, Hf(CH$_2$CMe$_3$)$_3$Cl, Hf(CH$_2$SiMe$_3$)$_3$Cl, Hf(CH$_2$Ph)$_2$Cl$_2$, Hf(CH$_2$CMe$_3$)$_2$Cl$_2$, Hf(CH$_2$SiMe$_3$)$_2$Cl$_2$, Hf(NMe$_2$)$_4$, Hf(NEt$_2$)$_4$, and Hf(N(SiMe$_3$)$_2$)$_2$Cl$_2$; ZrCl$_4$, ZrMe$_4$, Zr(CH$_2$Ph)$_4$, Zr(CH$_2$CMe$_3$)$_4$, Zr(CH$_2$SiMe$_3$)$_4$, Zr(CH$_2$Ph)$_3$Cl, Zr(CH$_2$CMe$_3$)$_3$Cl, Zr(CH2SiMe$_3$)$_3$Cl, Zr(CH$_2$Ph)$_2$Cl$_2$, Zr(CH$_2$CMe$_3$)$_2$Cl$_2$, Zr(CH$_2$SiMe$_3$)$_2$Cl$_2$, Zr(NMe$_2$)$_4$, Zr(NEt$_2$)$_4$, Zr(NMe$_2$)$_2$Cl$_2$, Zr(NEt$_2$)$_2$Cl$_2$, and Zr(N(SiMe3)$_2$)$_2$Cl$_2$. In the previous list, the "Me" stands for methyl, "Et" stands for ethyl, "Ph" stands for phenyl, and "THF" stands for tetrahydrofuran. Lewis base adducts of these examples are also suitable as metal precursors, for example, ethers, amines, thioethers, and phosphines are suitable as Lewis bases. Specific examples include HfCl$_4$(THF)$_2$, HfCl$_4$(SMe$_2$)$_2$ and Hf(CH$_2$Ph)$_2$Cl$_2$(OEt$_2$). Activated metal precursors may be ionic or zwitterionic compounds, such as (M(CH$_2$Ph)$_3$$^+$)(B(C$_6$F$_5$)$_4$$^-$) or (M(CH$_2$Ph)$_3$$^+$)(PhCH$_2$B(C$_6$F$_5$)$_3$$^-$) where M is defined above as comprising Hf or Zr.

Each Z independently is O, S, N(C$_1$-C$_{40}$)hydrocarbyl, or P(C$_1$-C$_{40}$)hydrocarbyl. In some embodiments, each Z is different. In some embodiments, one Z is O and one Z is NCH$_3$. In some embodiments, Z is O and one Z is S. In other embodiments, one Z is S and one Z is N(C$_1$-C$_{40}$)hydrocarbyl (for example, NCH$_3$). In further embodiment, each Z is the same. In yet another embodiment, each Z is O. Alternatively, each Z may be S.

In formula (I), $R^{1-7}$ and $R^{10-16}$ are selected from the group consisting of $(C_1-C_{40})$hydrocarbyl, $(C_1-C_{40})$heterohydrocarbyl, Si(R$^C$)$_3$, P(R$^P$)$_2$, N(R$^N$)$_2$, OR$^C$, SR$^C$, NO$_2$, CN, CF$_3$, R$^C$S(O)—, R$^C$S(O)$_2$—, (R$^C$)$_2$C=N—, R$^C$C(O)O—, R$^C$OC(O)—, R$^C$C(O)N(R)—, (R$^C$)$_2$NC(O)—, halogen atoms, hydrogen atoms, or combinations thereof.

In some embodiments of formula (I), $R^8$ and $R^9$ consist of hydrogen atoms, $R^{23}$ and $R^{24}$ are independently selected from a —(CR$^C_2$)$_m$—, wherein the m is an integer from 1 to 10. In some embodiments of formula (I), $R^{17-22}$ are independently selected from a hydrogen atom or a $(C_1-C_{40})$ hydrocarbyl. In another embodiment, two or more groups selected from $R^{17-22}$ can form a covalent bond and form a ring structure, with such ring structures having from 3 to 50 atoms in the ring, excluding any hydrogen atoms. In some embodiments of formula (I), either $R^1$, $R^{16}$, or both comprise formula (II), formula (III), or formula (IV):

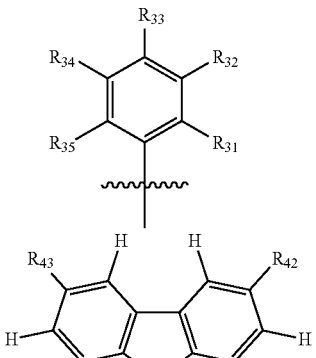

II

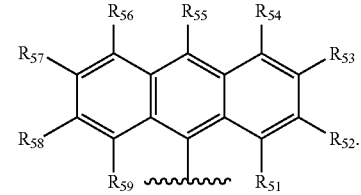

IV

In some embodiments, $R^1$ and $R^{16}$ are chosen from the same group.

In one or more embodiments, $R^{31-35}$, $R^{41-44}$, and $R^{51-59}$ are independently chosen from $(C_1-C_{40})$hydrocarbyl, $(C_1-C_{40})$heterohydrocarbyl, Si(R$^C$)$_3$, P(R$^P$)$_2$, N(R$^N$)$_2$, OR$^C$, SR$^C$, NO$_2$, CN, CF$_3$, R$^C$S(O)—, R$^C$S(O)$_2$—, (R$^C$)$_2$C=N—, R$^C$C(O)O—, R$^C$OC(O)—, R$^C$C(O)N(R)—, (R$^C$)$_2$NC(O)—, halogen atoms, hydrogen atoms, or combinations thereof. Independently each R$^C$ is unsubstituted $(C_1-C_{18})$hydrocarbyl, each $R^P$ is unsubstituted $(C_1-C_{18})$hydrocarbyl, and each $R^N$ is unsubstituted $(C_1-C_{18})$hydrocarbyl or absent. When $R^N$ is absent then N comprises —N≡.

In some embodiments, two of $R^{17-19}$, two of $R^{20-22}$ or both are members in a $C_5$-$C_6$ cycloalkyl ring structure. When two of the $R^{17-19}$ are members in a $C_5$ cycloalkyl ring structure, then there is a cyclopentyl group bonded to the silicon atom of the silyl bridge. Some embodiments have two cyclopentyl groups bonded to the silicon atom of the silyl bridge. Alternatively, the $R^{17-19}$ could be members in a $C_6$ cycloalkyl ring structure, meaning a cyclohexyl ring would be bonded to the silicon atom of the silyl bridge. In one embodiment, the sum of the non-hydrogen atoms for $R^{17-19}$ is larger than 1, and/or the sum of the non-hydrogen atoms for $R^{20-22}$ is larger than 1. In another embodiment, two of $R^{17-19}$, two of $R^{20-22}$ or both are methyl groups.

Without being bound by theory, these silyl-bridged catalysts achieve a desirable combination of properties such as good comonomer incorporation, high efficiency, a narrow MWD and narrow short chain branching distribution. Good comonomer incorporation includes ethylene/α-olefin reactivity ratios less than or equal to twenty. The lower the reactivity ratio the better the comonomer incorporation.

Reactivity ratios of catalysts may be obtained by known methods, for example, the technique described in "Linear Method for Determining Monomer Reactivity Ratios in Copolymerization," M. Fineman and S. D. Ross, J. Polymer Science, 5, 259 (1950) or "Copolymerization," F. R. Mayo and C. Walling, Chem. Rev., 46, 191 (1950). One widely used copolymerization model is based on the following equations:

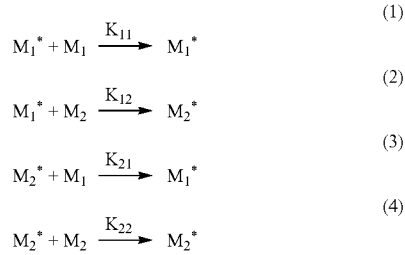

wherein $M_1$ refers to a monomer molecule which is arbitrarily designated as "i" wherein i=1, 2; and $M_2^*$ refers to a growing polymer chain to which monomer i has most recently attached.

The K values are the rate constants for the indicated reactions. For example, in ethylene/propylene copolymerization, $K_{11}$ represents the rate at which an ethylene unit inserts into a growing polymer chain in which the previously inserted monomer unit was also ethylene. The reactivity ratios follow as: $r_1=K_{11}/K_{12}$ and $r_2=K_{22}/K_{21}$ wherein $K_{11}$, $K_{12}$ and $K_{21}$ are the rate constants for ethylene (1) or propylene (2) addition to a catalyst site where the last polymerized monomer is an ethylene ($K_{1x}$) or propylene ($K_{2x}$).

In one embodiment, when at least one of $R^1$ and $R^{16}$ is formula (III), then at least one $R^{42}$, $R^{43}$ or both are tert-butyl (t-Bu) groups.

Certain carbon atom-containing chemical groups can be represented by the form "$(C_x-C_y)$," which means that the unsubstituted version of the chemical group comprises from a number x carbon atoms to a number y carbon atoms, in which each x and y independently is an integer as described for the chemical group. The $R^s$ substituted version of the chemical group can contain more than y carbon atoms depending of nature of $R^s$. Thus, for example an unsubstituted $(C_1-C_{40})$alkyl contains from 1 to 40 carbon atoms (x=1 and y=40). When the chemical group is substituted by one or more carbon atom-containing $R^s$ substituents, the substituted $(C_x-C_y)$ chemical group may comprise more than y total carbon atoms, which means that the total number of carbon atoms of the substituent is equal to y plus the sum of the number of carbon atoms in each of the carbon atom-containing substituents.

In some embodiments, each of the chemical groups (e.g., X, R, Z, etc.) of the metal-ligand complex of formula (I) may be unsubstituted, that is, can be defined without use of a substituent $R^s$, provided the above-mentioned conditions are satisfied. In other embodiments, at least one of the chemical groups of the metal ligand complex of formula (I) independently contain one or more of the substituents $R^s$. In most embodiments, there are not more than a total of 20 $R^s$, and in other embodiments, not more than a total of 10 $R^s$, and in some embodiments, not more than a total of 5 $R^s$ in the metal ligand complex of formula (I). Where the compound contains two or more substituents $R^s$, each $R^s$ independently is bonded to a same or different substituted chemical group. When two or more $R^s$ are bonded to a same chemical group, they independently are bonded to a same or different carbon atom or heteroatom in the same chemical group up to and including persubstitution of the chemical group.

The term "substitution" means each hydrogen atom (H) bonded to a carbon atom or heteroatom of a corresponding unsubstituted compound or functional group is replaced by a substituent (e.g., $R^s$). The term "polysubstitution" means each of at least two, but not all, hydrogen atoms bonded to carbon atoms or heteroatoms of a corresponding unsubstituted compound or functional group is replaced by a substituent. The $(C_1-C_{18})$alkylene and $(C_1-C_8)$alkylene substituents are especially useful for forming substituted chemical groups that are bicyclic or tricyclic analogs of corresponding monocyclic or bicyclic unsubstituted chemical groups.

The term "$(C_1-C_{40})$hydrocarbyl" means a hydrocarbon radical of from 1 to 40 carbon atoms and the term "$(C_1-C_{40})$hydrocarbylene" means a hydrocarbon diradical of from 1 to 40 carbon atoms, in which each hydrocarbon radical and diradical independently is aromatic (6 carbon atoms or more) or non-aromatic, saturated or unsaturated, straight chain or branched chain, cyclic (including mono- and polycyclic, fused and non-fused polycyclic, including bicyclic; 3 carbon atoms or more) or acyclic, or a combination of two or more thereof; and each hydrocarbon radical and diradical independently is the same as or different from another hydrocarbon radical and diradical, respectively, and independently is unsubstituted or substituted by one or more $R^s$.

In this disclosure, a $(C_1-C_{40})$hydrocarbyl independently can be an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene. In some embodiments, each of the aforementioned $(C_1-C_{40})$hydrocarbyl groups independently has a maximum of 20 carbon atoms (i.e., $(C_1-C_{20})$hydrocarbyl) and other embodiments, a maximum of 12 carbon atoms.

The terms "$(C_1-C_{40})$alkyl" and "$(C_1-C_{18})$alkyl" mean a saturated straight or branched hydrocarbon radical of from 1 to 40 carbon atoms or from 1 to 18 carbon atoms, respectively, that is unsubstituted or substituted by one or more $R^s$. Examples of unsubstituted $(C_1-C_{40})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl;

2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$ alkyl, substituted $(C_1-C_{10})$alkyl, trifluoromethyl, and $(C_{45})$alkyl. The $(C_{45})$alkyl is, for example, a $(C_{27}-C_{40})$alkyl substituted by one $R^s$, which is a $(C_1-C_5)$alkyl, respectively. In some embodiments, each $(C_1-C_5)$alkyl independently is methyl, trifluoromethyl, ethyl, 1-propyl, 1-methylethyl, or 1,1-dimethylethyl.

The term "$(C_6-C_{40})$aryl" means an unsubstituted or substituted (by one or more $R^s$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2 or 3 rings, respectively; wherein the 1 ring is aromatic and the 2 or 3 rings independently are fused or non-fused and at least one of the 2 or 3 rings is aromatic. Examples of unsubstituted $(C_6-C_{40})$aryl are unsubstituted $(C_6-C_{20})$aryl unsubstituted $(C_6-C_{18})$aryl; 2-$(C_1-C_5)$alkyl-phenyl; 2,4-bis$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl are substituted $(C_1-C_{20})$aryl; substituted $(C_6-C_{18})$aryl; 2,4-bis[$(C_{20})$alkyl]-phenyl; polyfluorophenyl; pentafluorophenyl; and fluoren-9-one-1-yl.

The term "$(C_3-C_{40})$cycloalkyl" means a saturated cyclic hydrocarbon radical of from 3 to 40 carbon atoms that is unsubstituted or substituted by one or more $R^s$. Other cycloalkyl groups (e.g., $(C_3-C_{12})$alkyl) are defined in an analogous manner. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{40})$hydrocarbylene are unsubstituted or substituted $(C_6-C_{40})$arylene, $(C_3-C_{40})$cycloalkylene, and $(C_1-C_{40})$alkylene (e.g., $(C_1-C_{20})$alkylene). In some embodiments, the diradicals are a same carbon atom (e.g., —CH2-) or on adjacent carbon atoms (i.e., 1,2-diradicals), or are spaced apart by one, two, or more intervening carbon atoms (e.g., respective 1,3-diradicals, 1,4-diradicals, etc.). Some embodiments incorporate a 1,2-, 1,3-, 1,4-, or an alpha, omega-diradical, and others a 1,2-diradical. The alpha, omega-diradical is a diradical that has maximum carbon backbone spacing between the radical carbons. Some embodiments incorporate a 1,2-diradical, 1,3-diradical, or 1,4-diradical version of $(C_6-C_{18})$arylene, $(C_3-C_{20})$cycloalkylene, or $(C_2-C_{20})$alkylene.

The term "$(C_1-C_{40})$alkylene" means a saturated straight chain or branched chain diradicals (i.e., the radicals are not on ring atoms) of from 1 to 40 carbon atoms that is unsubstituted or substituted by one or more $R^s$. Examples of unsubstituted $(C_1-C_{40})$alkylene are unsubstituted $(C_1-C_{20})$alkylene, including unsubstituted 1,2-$(C_2-C_{10})$alkylene; including unsubstituted 1,3-$(C_3-C_{10})$alkylene; 1,4-$(C_4-C_{10})$alkylene; —C—, —CH$_2$CH$_2$—, —(CH$_2$)$_3$—, —CH$_2$CHCH$_3$, —(CH$_2$)$_4$—, —(CH$_2$)$_5$—, —(CH$_2$)$_6$—, —(CH$_2$)$_7$—, —(CH$_2$)$_8$—, and —(CH$_2$)$_4$C(H)(CH$_3$)—. Examples of substituted $(C_1-C_{40})$alkylene are substituted $(C_1-C_{20})$alkylene, —CF$_2$—, —C(O)—, and —(CH$_2$)$_{14}$C(CH$_3$)$_2$(CH$_2$)$_5$— (i.e., a 6,6-dimethyl substituted normal-1, 20-eicosylene). Since as mentioned previously two $R^s$ may be taken together to form a $(C_1-C_{18})$alkylene, examples of substituted $(C_1-C_{40})$alkylene also include 1,2-bis(methylene)cyclopentane, 1,2-bis(methylene)cyclohexane, 2,3-bis(methylene)-7,7-dimethyl-bicyclo[2.2.1]heptane, and 7,3-bis (methylene)bicyclo[2.2.2]octane.

The term "$(C_3-C_{40})$cycloalkylene" means a cyclic diradical (i.e., the radicals are on ring atoms) of from 3 to 40 carbon atoms that is unsubstituted or substituted by one or more $R^s$.

The term "heteroatom," "heterohydrocarbon" refers to a molecule or molecular framework in which one or more carbon atoms are replaced with an atom other than carbon or hydrogen. The term "$(C_1-C_{40})$heterohydrocarbyl" means a heterohydrocarbon radical of from 1 to 40 carbon atoms and the term "$(C_1-C_{40})$heterohydrocarbylene" means a heterohydrocarbon diradical of from 1 to 40 carbon atoms, and each heterohydrocarbon independently has one or more heteroatoms, for example O, S, S(O), S(O)$_2$, Si($R^C$)$_2$, P($R^P$), and N($R^N$). Independently each $R^C$ is unsubstituted $(C_1-C_{18})$hydrocarbyl, each $R^P$ is unsubstituted $(C_1-C_{19})$hydrocarbyl, and each $R^N$ is unsubstituted $(C_1-C_{18})$hydrocarbyl or absent. When $R^N$ is absent then N comprises —N=. The heterohydrocarbon radical, and each of the heterohydrocarbon diradicals, independently is on a carbon atom or heteroatom thereof, and in most embodiments, it is on a carbon atom when bonded to a heteroatom formula (I) or to a heteroatom of another heterohydrocarbyl or heterohydrocarbylene. Each $(C_1-C_{40})$heterohydrocarbyl and $(C_1-C_{40})$heterohydrocarbylene independently is unsubstituted or substituted (by one or more $R^s$), aromatic or non-aromatic, saturated or unsaturated, straight chain or branched chain, cyclic (including mono- and poly-cyclic, fused and non-fused polycyclic) or acyclic, or a combination of two or more thereof; and each is respectively the same as or different from another.

In some embodiments, the $(C_1-C_{40})$heterohydrocarbyl independently is unsubstituted or substituted $(C_1-C_{40})$heteroalkyl, $(C_1-C_{40})$hydrocarbyl-O—, $(C_1-C_{40})$hydrocarbyl-S—, $(C_1-C_{40})$hydrocarbyl-S(O)—, $(C_1-C_{40})$hydrocarbyl-S(O)$_2$—, $(C_1-C_{40})$hydrocarbyl-Si($R^c$)$_2$—, $(C_1-C_{40})$hydrocarbyl-N($R^N$)—, $(C_1-C_{40})$hydrocarbyl-P($R^P$)—, $(C_2-C_{40})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{40})$heteroaryl, $(C_1-C_{19})$heteroaryl-(C1-C20)alkylene, $(C_6-C_{20})$aryl-$(C_1-C_{19})$heteroalkylene, or $(C_1-C_{19})$heteroaryl-$(C_1-C_{20})$heteroalkylene.

The term "$(C_4-C_{40})$heteroaryl" means an unsubstituted or substituted (by one or more $R^s$) mono-, bi- or tricyclic heteroaromatic hydrocarbon radical of from 1 to 40 total carbon atoms and from 1 to 4 heteroatoms, and the mono-, bi- or tricyclic radical comprises 1, 2 or 3 rings, respectively, wherein the 2 or 3 rings independently are fused or non-fused and at least one of the 2 or 3 rings is heteroaromatic. Other heteroaryl groups (e.g., $(C_4-C_{12})$heteroaryl) are defined in an analogous manner. The monocyclic heteroaromatic hydrocarbon radical is a 5-membered or 6-membered ring. The 5-membered ring has from 2 to 4 carbon atoms and from 3 to 1 heteroatoms, respectively, each heteroatom being O, S, N, or P. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 4 or 5 carbon atoms and 2 or 1 heteroatoms, the heteroatoms being N or P. Examples of 6-membered ring heteroaromatic hydrocarbon radical are pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f] indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The aforementioned heteroalkyl and heteroalkylene groups are saturated straight or branched chain radicals or diradicals, respectively, containing ($C_1$-$C_{40}$) carbon atoms, or fewer carbon atoms and one or more of the heteroatoms $Si(R^c)_2$, $P(R^P)$, $N(R^N)$, N, O, S, S(O), and $S(O)_2$ as defined above, wherein each of the heteroalkyl and heteroalkylene groups independently are unsubstituted or substituted by one or more $R^s$.

Examples of unsubstituted ($C_2$-$C_{40}$)heterocycloalkyl are unsubstituted ($C_2$-$C_{20}$)heterocycloalkyl, unsubstituted ($C_2$-$C_{10}$)heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cycloodyl, 5-thio-cyclononyl, and 2-aza-cyclodecyl.

The term "halogen atom" means fluorine atom (F), chlorine atom (Cl), bromine atom (Br), or iodine atom (I) radical. The terns "halide" means fluoride (F−), chloride (Cl−), bromide (Br−), or iodide (I−) anion.

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^s$, one or more double and/or triple bonds optionally may or may not be present in substituents $R^s$. The term "unsaturated" means containing one or more carbon-carbon double bonds, carbon-carbon bonds, and (in heteroatom-containing groups) carbon-nitrogen, carbon-phosphorous, and carbon-silicon double bonds, not including any such double bonds that may be present in substituents $R^s$, if any, or in (hetero) aromatic rings, if any.

Comparative Catalyst A is a conventional catalyst that is discussed further in the Examples below.

The catalysts in this disclosure are altered to enhance the physical properties of the resulting polymers and copolymers. By changing the substituents on the silyl bridge and on the aromatic scaffolding of the catalyst, polymers with better physical properties are synthesized. In some embodiments, the metal ligand complex of formula (I) is a metal ligand complex of any one of the following formulas:

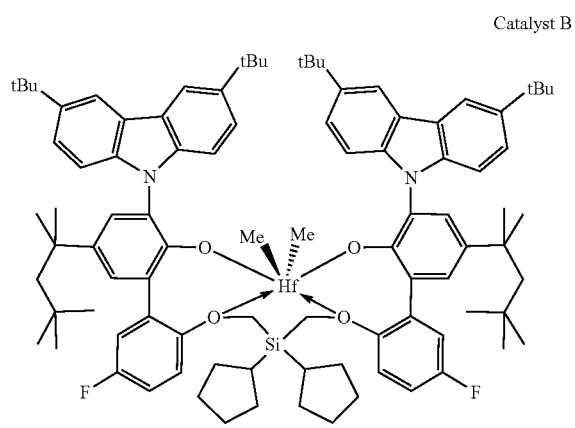

Catalyst B

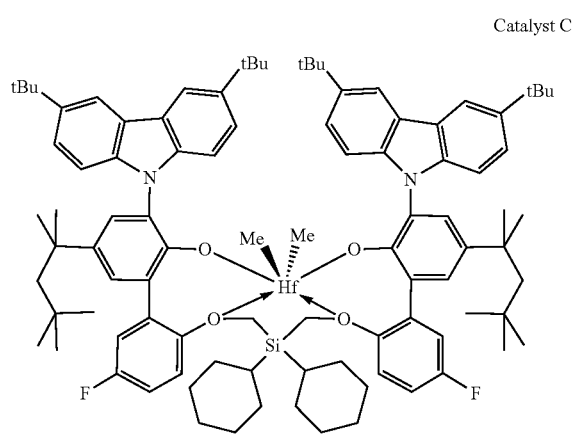

Catalyst C

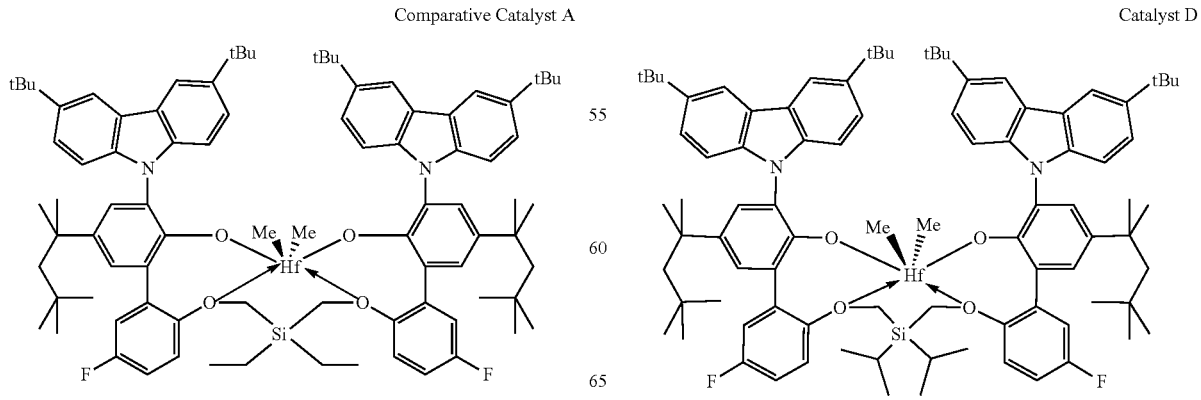

Comparative Catalyst A

Catalyst D

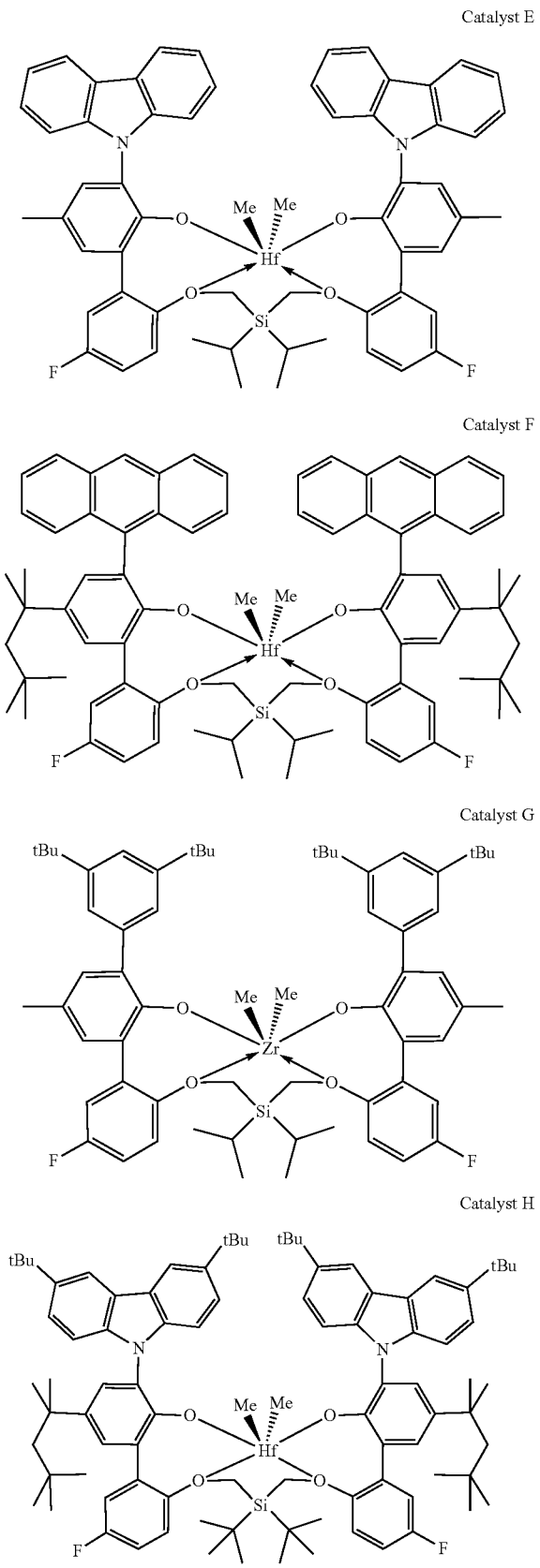

Catalyst E

Catalyst F

Catalyst G

Catalyst H

An overlay of the molecular weight distribution of five polymers resulting from the catalyst systems of Catalyst B, Catalyst C, Catalyst D, Catalyst H, and Comparative Catalyst A is provided in FIG. 1. The molecular weight distribution (MWD) was calculated by Gel Permeation Chromatography (GPC). While Comparative Catalyst A is not have a narrow PDI, the results for other Catalyst indicates a narrower MWD. The MWD of the polymer formed by Comparative Catalyst A has a broad band occurring around 4.50 in FIG. 1, which correlated to a broad MWD, which may be detrimental to the performance of the polymer.

Figure 2:
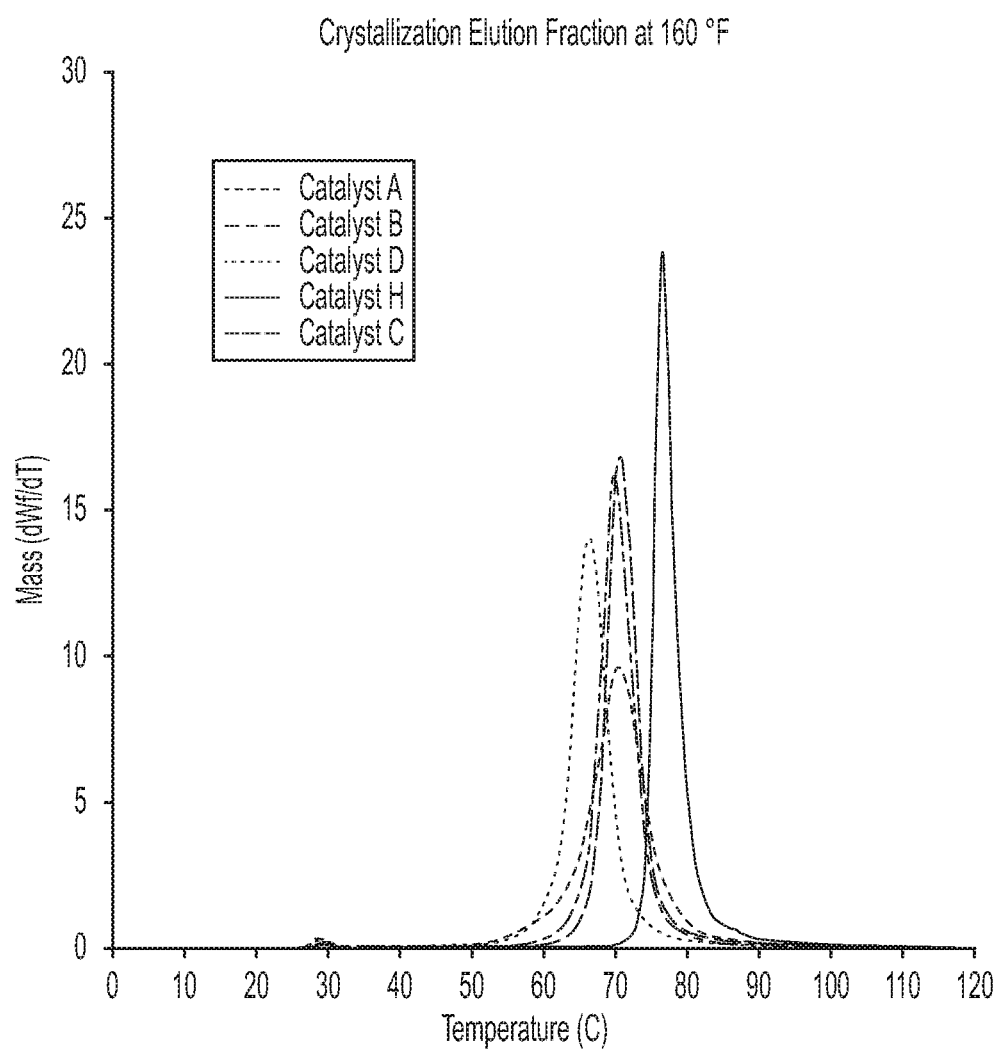
FIG. 2 is a graph of the Crystallization Elution Fractionation (CEF) overlay results from five polymers synthesized from five catalyst systems.

Moreover, an overlay of the mass elution fractions as a function of temperature of five polymers resulting from the catalyst systems of Catalyst B, Catalyst C, Catalyst D, Catalyst H, and Comparative Catalyst A is provided in FIG. 2.

Cocatalyst Component

The procatalyst comprising the metal-ligand complex of formula (I) is rendered catalytically active by contacting it to, or combining it with, the activating co-catalyst or by using an activating technique such as those that are known the art for use with metal-based olefin polymerization reactions. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing condition(s). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes are methylalumoxane, triisobutylaluminum-modified methylalumoxane, and isobutylalumoxane.

Lewis acid activating co-catalysts are Group 13 metal compounds containing from 1 to 3 hydrocarbyl substituents as described herein. In one embodiment, Group 13 metal compounds are tri(hydrocarbyl)-substituted-aluminum or tri(hydrocarbyl)-boron compounds. In other embodiments, Group 13 metal compounds are tri(hydrocarbyl)-substituted-aluminum, tri(hydrocarbyl)-boron compounds, tri(($C_1$-$C_{10}$) alkyl)aluminum, tri(($C_6$-$C_{18}$)aryl)boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tris(($C_1$-$C_{20}$)hydrocarbyl borate (e.g. trityl tetrafluoroborate) or a tri(($C_1$-$C_{20}$)hydrocarbyl)ammonium tetra(($C_1$-$C_{20}$)hydrocarbyl)borane (e.g. bis(octadecyl)methylammonium tetrakis(pentafluorophenyl)borane). As used herein, the term "ammonium" means a nitrogen cation that is a (($C_1$-$C_{20}$)hydrocarbyl)$_4$N$^+$ a (($C_1$-$C_{20}$)hydrocarbyl)$_3$N(H)$^+$, a (($C_1$-$C_{20}$)hydrocarbyl)$_2$N(H)$_2$$^+$, ($C_1$-$C_{20}$)hydrocarbylN(H)$_3$$^+$, or N(H)$_4$$^+$, wherein each ($C_1$-$C_{20}$)hydrocarbyl may be the same or different.

Combinations of neutral Lewis acid activating co-catalysts include mixtures comprising a combination of a tri(($C_1$-$C_4$)alkyl)aluminum and a halogenated tri(($C_6$-$C_{18}$)aryl) boron compound, especially a tris(pentafluorophenyl) borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex):(tris(pentafluoro-phenylborane):

(alumoxane) [e.g., (Group 4 metal-ligand complex):(tris (pentafluoro-phenylborane):(alumoxane)] are from 1:1:1 to 1:10:30, in other embodiments, from 1:1:1.5 to 1:5:10.

The pro-catalyst comprising the metal ligand complex of formula (I) may be activated to form an active catalyst composition by combination with one or more cocatalysts, for example, a cation forming cocatalyst, a strong Lewis acid, or a combinations thereof. Suitable co-catalysts for use include polymeric or oligomeric aluminoxanes, especially methyl aluminoxane, as well as inert, compatible, noncoordinating, ion forming compounds. Exemplary suitable co-catalysts include, but are not limited to modified methyl aluminoxane (MMAO), bis(hydrogenated tallow alkyl)methyl, tetrakis(pentafluorophenyl)borate(1-) amine, and combinations thereof.

In some embodiments, one or more of the foregoing activating co-catalysts are used in combination with each other. An especially preferred combination is a mixture of a tri(($C_1$-$C_4$)hydrocarbyl)aluminum, tri(($C_1$-$C_4$)hydrocarbyl)borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the member of moles of the metal-ligand complex of formula (I). When tris(pentafluorophenyl)borane alone is used as the activating co-catalyst, in some other embodiments, the number of moles of the tris(pentafluorophenyl)borane that are employed to the total number of moles of one or more metal-ligand complexes of formula (I) form 0.5:1 to 10:1, in some other embodiments, from 1:1 to 6:1, in some other embodiments, from 1:1 to 5:1. The remaining activating co-catalysts are generally employed in approximately mole quantities equal to the total mole quantities of one or more metal-ligand complexes of formula (I).

Polyolefins

The catalytic systems described in the preceding paragraphs are utilized in the polymerization of olefins, primarily ethylene and propylene. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 10 carbon atoms or 3 to 8 carbon atoms. Exemplary α-olefin co-monomers include, but are not limited to, propylene, 1-butene, 1-pentene, 1-hexene 1-heptene, 1-octene, 1-nonene, 1-decene, and 4-methyl-1-pentene. For example, the one or more α-olefin co-monomers may be selected from the group consisting of propylene, 1-butene, 1-hexene, and 1-octene; or in the alternative, from the group consisting of 1-hexene and 1-octene.

The ethylene based polymers, for example homopolymers and/or interpolymers (including copolymers) of ethylene and optionally one or more co-monomers such as α-olefins may comprise at least 50 percent by weight of units derived from ethylene. All individual values and subranges from at least 50 percent are disclosed; for example, the ethylene based polymers, homopolymers and/or in interpolymers (including copolymers) of ethylene and optionally one or more co-monomers such as α-olefins may comprise at least 60 percent by weight of units derived from ethylene; at least 70 percent by weight of units derived from ethylene; at least 80 percent by weight of units derived from ethylene; or from 50 to 100 percent by weight of units derived from ethylene; or from 80 to 100 percent by weight of units derived from ethylene.

In some embodiments, the ethylene based polymers may comprise at least 90 percent by moles of units derived from ethylene. All individual values and subranges from at least 90 mole percent are included herein and disclosed herein. For example, the ethylene based polymers may comprise at least 93 percent by moles of units derived from ethylene; at least 96 percent by moles of units; at least 97 percent by moles of units derived from ethylene; or in the alternative, from 90 to 100 percent by moles of units derived from ethylene; from 90 to 99.5; or from 97 to 99.5 percent by moles of units derived from ethylene.

In some embodiments of the ethylene based polymer, the amount of additional α-olefin is less than 50%; other embodiments include at least 1 mole percent (mol %) to 20 mol %; and in further embodiments the amount of additional α-olefin includes at least 5 mol % to 10 mol %. In some embodiments, the additional α-olefin is 1-octene.

Any conventional polymerization processes may be employed to produce the ethylene based polymers. Such conventional polymerization processes include, but are limited to, solution polymerization process, gas phase polymerization process, slurry phase polymerization process, and combinations thereof using one or more conventional reactors e.g. loop reactors, isothermal reactors, fluidized bed gas phase reactors, stirred tank reactors, batch reactors in parallel, series, and/or any combinations thereof.

In one embodiment, the ethylene based polymer may be produced via solution polymerization in a dual reactor system, for example a dual loop reactor system, wherein ethylene and optionally one or more α-olefins are polymerized in the presence of the catalyst system, as described herein, and optionally one or more co-catalysts. In another embodiment, the ethylene based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the ethylene based polymer may be produced via solution polymerization in a single reactor system, for example a single loop reactor system in which ethylene and optionally one or more α-olefins are polymerized in the presence of the catalyst system as described within this disclosure, and optionally one or more cocatalysts, as described in the preceding paragraphs.

The ethylene based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene based polymers may contain any amounts of additives. The ethylene based polymers may comprise from about 0 to about 10 percent by the combined weight of such additives, based on the weight of the ethylene based polymers and the one or more additives. The ethylene based polymers may further comprise fillers, which may include, but are not limited to, organic or inorganic fillers. Such fillers, e.g. calcium carbonate, talc, $Mg(OH)_2$, can be present in levels from about 0 to about 20, based on the weight of the ethylene based polymers and the one or more additives, fillers or both. The ethylene based polymers may further be blended with one or more polymers to form a blend.

In some embodiments of this disclosure, a polymerization process for producing an ethylene-based polymer comprising polymerizing ethylene and at least one additional α-olefin in the presence of a catalyst system, wherein the catalyst system comprises a pro-catalyst defined by the metal ligand complex of formula (I). The polymer resulting from the catalyst system, which includes formula (I) has a density from 0.850 to 0.950 g/cc, from 0.875 to 0.920 g/cc, from 0.880 to 0.910 g/cc, or from 0.880 to 0.900 g/cc according to ASTM D792.

In another embodiment, the polymer resulting from the catalyst system that includes the metal ligand complex of formula (I) has a melt flow ratio $(I_{10}/I_2)$ from 5 to 15, in which melt index $I_2$ is measured according to ASTM D1238 at 190° C. and 2.16 kg load, and melt index $I_{10}$ is measured according to ASTM D1238 at 190° C. and 10 kg load. In other embodiments the melt flow ratio $(I_{10}/I_2)$ is from 5 to 10, and in others, the melt flow ratio is from 5 to 7.

In some embodiments, the polymer resulting from the catalyst system that includes metal ligand complex of formula (I) has a molecular weight distribution (MWD) from 1 to 10, wherein MWD is defined as $M_w/M_n$ with $M_w$ being a weight average molecular weight and $M_n$ being a number average molecular weight. In other embodiments, the polymers resulting from the catalyst system have a MWD from 1 to 6. Another embodiment includes a MWD from 1 to 3; and other embodiments include MWD from 1.5 to 2.5.

The different embodiments of the pro-catalyst system described in this disclosure yields unique polymer properties due to the polymer high molecular weight and the amount of the co-monomers incorporated. Results indicate that the pro-catalyst of formula (I) exhibits single site behavior

EXAMPLES

Specific embodiments for the synthesis of the catalyst are listed in the proceeding paragraphs.

E-1. Preparation of 9-(5-methyl-2-((tetrahydro-2H-pyran-2-yl)oxy)-3-(4,4,5,5-tetramethyl-1,3,2-dioxaborolan-2-yl)phenyl)-9H-carbazole

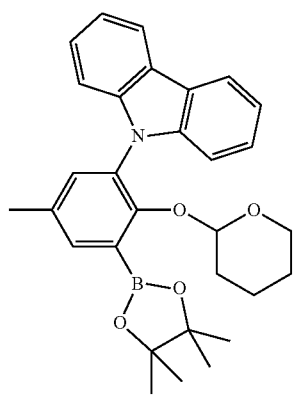 [SMILES: Cc1cc(B2OC(C)(C)C(C)(C)O2)c(OC2CCCCO2)c(-n2c3ccccc3c3ccccc32)c1]

The synthetic procedures of WO 2016/003879 A1 were substantially repeated to prepare 9-(5-methyl-2-((tetrahydro-2H-pyran-2-yl)oxy)-3-(4,4,5,5-tetramethyl-1,3,2-dioxaborolan-2-yl)phenyl)-9H-carbazole.

E-2. Preparation of 3,6-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole

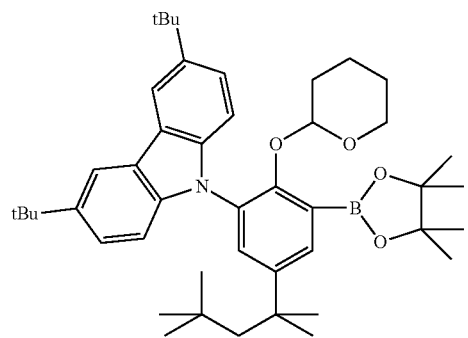 [SMILES: CC(C)(C)CC(C)(C)c1cc(B2OC(C)(C)C(C)(C)O2)c(OC2CCCCO2)c(-n2c3ccc(C(C)(C)C)cc3c3cc(C(C)(C)C)ccc32)c1]

The synthetic procedures of US 20110282018 A1 were substantially repeated to prepare 3,6-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole.

E-3. Preparation of bis((2-bromo-4-fluorophenoxy)methyl)dicyclopentylsilane

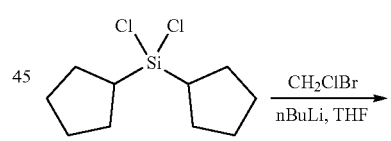

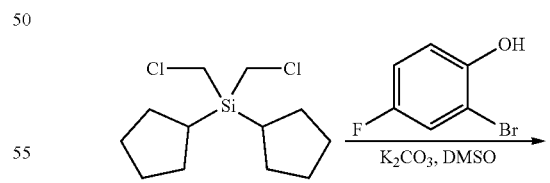

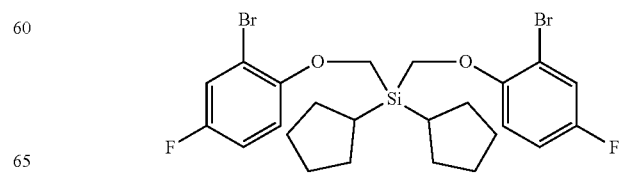

In a glove-box, dicyclopentyldichlorosilane (4.75 g, 20 millimoles (mmol), 1.0 equivalent (eq)) was dissolved in anhydrous tetrahydrofuran (THF) (120 milliliters (mL)) in a 250 mL single-neck round-bottom flask. The flask was capped with a septum, sealed, taken out of the glove-box, and cooled to −78° C. in a dry ice-acetone bath. Bromochloromethane (3.9 mL, 60 mmol, 3.0 eq) was added. A solution of n-butyl lithium (n-BuLi) (18.4 mL, 46 mmol, 2.3 eq) in hexane was added to the cooled wall of the flask over a period of 3 h using a syringe pump. The mixture was allowed to warm up to room temperature overnight (16 h) and saturated $NH_4Cl$ (30 mL) was added. The two layers were separated. The aqueous layer was extracted with ether (2×50 mL). The combined organic layer was dried over $MgSO_4$, filtered and concentrated under reduced pressure. The crude product was used for the next step without further purification.

A 250 mL round-bottom flask was charged with bis(chloromethyl)dicyclopentylsilane (2.65 g, 10 mmol, 1.0 eq), 2-bromo-4-fluorophenol (5.73 g, 30 mmol, 3.0 eq), $K_2CO_3$ (5.53 g, 40 mmol, 4.0 eq), and dimethylsulfoxide (DMSO) (70 mL). The reaction mixture was stirred at 60° C. overnight then at 100° C. for 2 hours. After cooling down to room temperature, the reaction mixture was poured into water to precipitate the product. The resulting emulsion was extracted with dichloromethane (DCM). The combined organic layer was dried over $MgSO_4$, filtered, and concentrated by reduced pressure. The residue was purified by column chromatography, and 1.9 g of a colorless oil was collected, resulting in a 33% yield.

$^1$H NMR (400 MHz, $CDCl_3$) δ 7.28-7.23 (m, 2H), 7.00-6.95 (m, 4H), 3.91 (s, 4H), 2.00-1.87 (m, 4H), 1.69-1.49 (m, 12H), 1.38-1.26 (m, 2H).

$^{19}$F{1H} NMR (376 MHz, $CDCl_3$) δ −122.74 (s, 2F).

E-4. Preparation of 6',6'''-(((dicyclopentylsilanediyl)bis(methylene))bis(oxy))bis(3-(3,6-di-tert-butyl-9H-carbazol-9-yl)-3'-fluoro-5-(2,4,4-trimethylpentan-2-yl)-[1,1'-biphenyl]-2-ol)

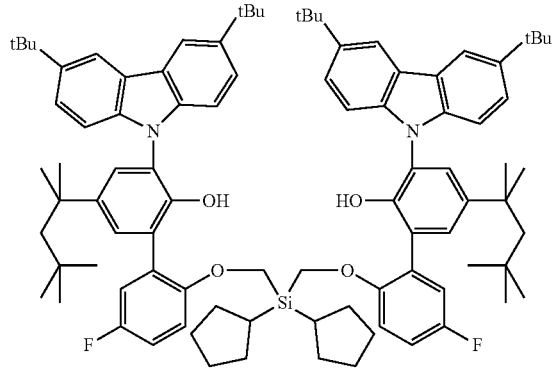

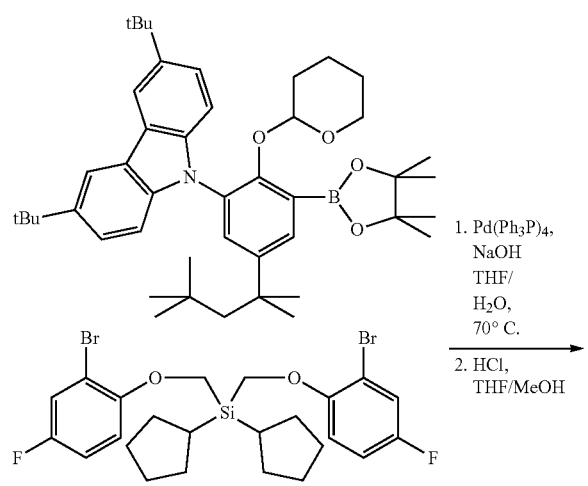

In a glove-box, a 40 mL vial was charged with bis((2-bromo-4-fluorophenoxy)methyl)dicyclopentylsilane (1.15 g, 2.0 mmol, 1.0 eq), 3,6-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (3.47 g, 5.0 mmol, 2.5 eq), and degassed THF (9.0 mL). The vial was capped and taken out of the glove-box and then a 2 molar (M) NaOH solution (7.0 mL, 14.0 mmol, 7.0 eq) was added. Nitrogen gas was purged through the stirred reaction mixture for 5 min to ensure complete degassing. A solution of $Pd(Ph_3P)_4$ (92 mg, 0.08 mmol, 0.04 eq) was then added in one portion. The reaction was heated to 70° C. for 18 hours with vigorous stirring. More 3,6-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (0.972 g, 1.4 mmol, 0.7 eq) and $Pd(Ph_3P)_4$ (46 mg, 0.046 mmol, 0.02 eq) were added and the reaction was stirred for an additional 18 hours at 70° C. After the reaction mixture was cooled down to room temperature, the organic layer was transferred to a 100 mL round bottom flask. The vial was rinsed with THF, which was then added to the round bottom flask. A mixture of 15 mL of MeOH and concentrated 1.0 mL of HCl was added, and reaction mixture was then refluxed (80-90° C.) for 2 hours. The reaction mixture was concentrated by rotary-evaporation. Water (50 mL) was added and the product was extracted by ether (70 mL×3). The extract was dried over $MgSO_4$ and filtered through a short pad of silica gel. After removing solvents, the residue was purified by crystallization in ether/ethanol, and 1.88 g of a white solid was collecting resulting in a 68% yield.

$^1$H NMR (400 MHz, $CDCl_3$) δ 8.24 (s, 4H), 7.42-7.35 (m, 4H), 7.33 (d, J=2.4 Hz, 2H), 7.15 (d, J=2.4 Hz, 2H), 7.03-6.89 (m, 4H), 6.78 (dd, J=8.7, 3.1 Hz, 2H), 6.36-6.24 (m, 2H), 5.39-5.31 (m, 2H), 5.29 (s, 2H), 3.44-3.11 (m, 4H), 1.65 (s, 4H), 1.51-1.22 (m, 6H), 0.74 (s, 18H).

$^{19}$F{1H} NMR (376 MHz, $CDCl_3$) δ −124.01 (s, 2F).

E-5. Preparation of Example Catalyst B

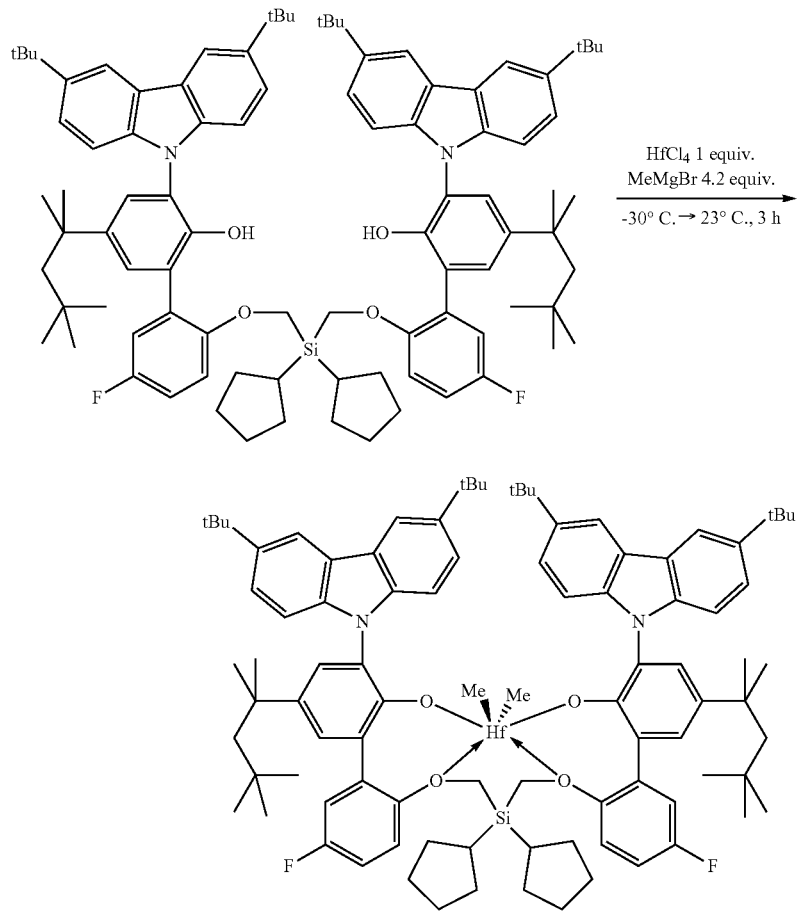

In a glove-box, an oven dried 40 mL vial with a stir bar was charged with HfCl$_4$ (64 mg, 0.2 mmol, 1.0 eq) and anhydrous toluene (6.0 mL). The vial was cooled to −30° C. in a freezer for at least 30 minutes. The vial was taken out of the freezer. MeMgBr (3 M, 0.28 mL, 0.84 mmol, 4.2 eq) was added to the stirring suspension. After 10 minutes, 6',6'''-(((dicyclopentylsilanediyl)bis(methylene))bis(oxy))bis(3-(3,6-di-tert-butyl-9H-carbazol-9-yl)-3'-fluoro-5-(2,4,4-trimethylpentan-2-yl)-[1,1'-biphenyl]-2-ol) (276 mg, 0.2 mmol, 1.0 eq) was added as solid. The resulting mixture was stirred at room temperature overnight. The solvents were removed under vacuum to yield a dark solid, which was extracted with hexanes (12 mL). The extract was concentrated to about 2 mL then kept in the freezer for one day. The solvent was decanted and the white solid was dried under vacuum yielding a white solid of 141 mg, resulting in a 44% yield.

$^1$H NMR (400 MHz, C$_6$D$_6$) δ 8.63 (d, J=1.9 Hz, 2H), 8.42 (d, J=2.0, 2H), 7.67-7.47 (m, 8H), 7.46-7.42 (m, 2H), 7.33 (d, J=2.4 Hz, 2H), 7.15-7.09 (m, 2H), 6.87-6.79 (m, 2H), 5.3-5.23 (m, 2H), 4.41 (d, J=14.0 Hz, 1H), 3.29 (d, J=14.0 Hz, 1H), 1.59-1.26 (m, 68H), 0.78 (s, 18H), 0.46-0.32 (m, 2H), −1.09 (s, 6H).

$^{19}$F{$^1$H} NMR (376 MHz, CDCl$_3$) δ −116.60 (m, 2F).

E-6. Preparation of bis((2-bromo-4-fluorophenoxy)methyl)dicyclohexylsilane

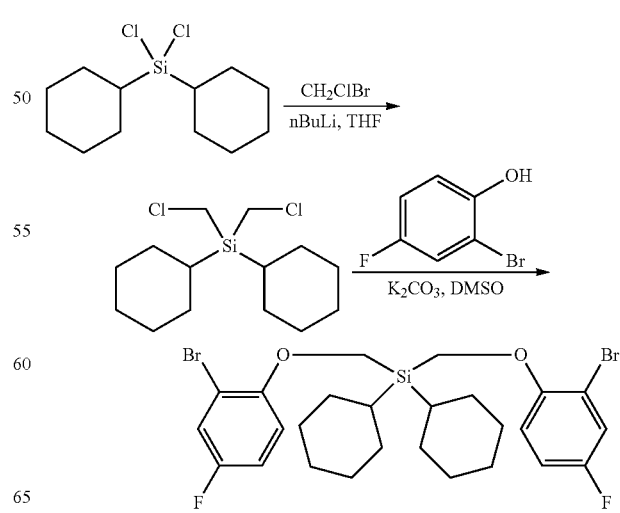

In a glove-box, dicyclohexyldichlorosilane (5.306 g, 20 mmol, 1.0 eq) was dissolved in anhydrous THF (120 mL) in a 250 mL single-neck round-bottom flask. The flask was capped with a septum, sealed, taken out of the glove-box, and cooled to −78° C. in a dry ice-acetone bath. Bromochloromethane (3.9 mL, 60 mmol, 3.0 eq) was added. A solution of n-BuLi (18.4 mL, 46 mmol, 2.3 eq) in hexane was added to the cooled wall of the flask over a period of 3 h using a syringe pump. The mixture was allowed to warm up to room temperature overnight (16 h) and saturated NH$_4$Cl (30 mL) was added. The two layers were separated. The aqueous layer was extracted with ether (2×50 mL). The combined organic layer was dried over MgSO$_4$, filtered and concentrated under reduced pressure. The crude product was used for the next step without further purification.

A 250 mL round-bottom flask was charged with bis(chloromethyl)dicyclohexylsilane (2.934 g, 10 mmol, 1.0 eq), 2-bromo-4-fluorophenol (5.73 g, 30 mmol, 3.0 eq), K$_2$CO$_3$ (5.53 g, 40 mmol, 4.0 eq), and DMSO (70 mL). The reaction mixture was stirred at 60° C. overnight then at 100° C. for 2 hours. After cooling down to room temperature, the reaction mixture was poured into water to precipitate the product. The resulting emulsion was extracted with DCM. The combined organic layer was dried over MgSO$_4$, filtered, and concentrated by rotary-evaporation. The residue was purified by column chromatography, and a colorless oil was collected, resulting in a 47% (2.84 g) yield.

$^1$H NMR (400 MHz, CDCl$_3$) δ 7.28-7.23 (m, 2H), 7.00-6.94 (m, 4H), 3.89 (s, 4H), 1.90-1.66 (m, 10H), 1.50-1.19 (m, 12H).

$^{19}$F{1H} NMR (376 MHz, CDCl$_3$) δ −122.70 (s, 2F).

E-7. Preparation of 6',6'''-(((dicyclohexylsilanediyl)bis(methylene))bis(oxy))bis(3-(3,6-di-tert-butyl-9H-carbazol-9-yl)-3'-fluoro-5-(2,4,4-trimethylpentan-2-yl)-[1,1'-biphenyl]-2-ol)

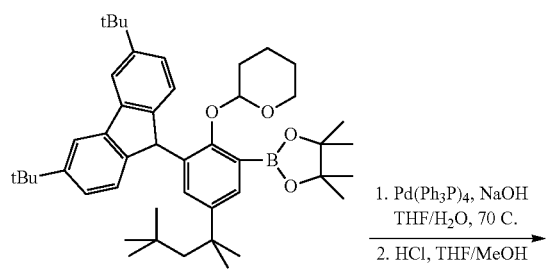

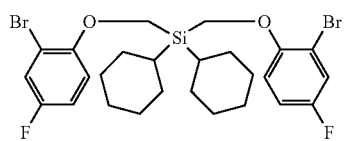

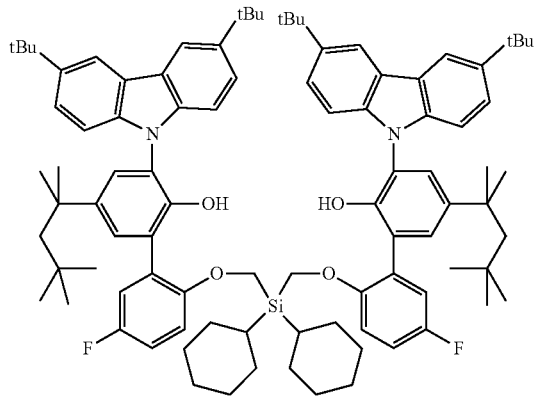

In a glove-box, a 40 mL vial was charged with bis((2-bromo-4-fluorophenoxy)methyl)dicyclohexylsilane (1.205 g, 2.0 mmol, 1.0 eq), 3,6-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (3.47 g, 5.0 mmol, 2.5 eq), and degassed THF (9.0 mL). The vial was capped and taken out of the glove-box and NaOH solution (2M, 7.0 mL, 14.0 mmol, 7.0 eq) was added. Nitrogen gas was purged through the stirred reaction mixture for 5 min to ensure complete degassing. A solution of Pd(Ph$_3$P)$_4$ (92 mg, 0.08 mmol, 0.04 eq) was then added in one portion. The reaction was heated to 70° C. for 18 hours with vigorous stirring. More 3,6-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (0.972 g, 1.4 mmol, 0.7 eq) and Pd(Ph$_3$P)$_4$ (46 mg, 0.046 mmol, 0.02 eq) were added and the reaction was stirred for additional 18 hours at 70° C. After cooling down to room temperature, the organic layer was transferred to a 100 mL round bottom flask. The vial was rinsed with 4 mL of THF, which was then added to the round bottom flask. A mixture of 15 mL of MeOH and 1.0 mL of concentrated HCl was added to the round bottom flask. The reaction mixture was refluxed (80-90° C.) for 2 hours, and then concentrated by reduced pressure. Water (50 mL) was added and the product was extracted by ether (70 mL×3). The extract was dried over MgSO$_4$ and filtered through a short pad of silica gel. After removing solvents, the residue was purified by crystallization in ether/ethanol. This procedure gave a 85% yield of 2.4 g of a white solid.

$^1$H NMR (400 MHz, CDCl$_3$) δ 8.5 (s, 4H), 7.43-7.32 (m, 6H), 7.16 (d, J=2.4 Hz, 2H), 6.97 (br s, 4H), 6.77 (dd, J=8.7, 3.1 Hz, 2H), 6.28 (br s, 2H), 5.38-5.31 (m, 2H), 5.29 (s, 2H), 3.21 (br s, 4H), 1.65 (s, 4H), 1.56-1.28 (m, 60H), 1.00-0.87 (m, 8H), 0.74 (s, 18H), 0.67-0.56 (m, 2H).

$^{19}$F{1H} NMR (376 MHz, CDCl$_3$) δ −124.07 (s, 2F).

E-8. Preparation of Example Catalyst C

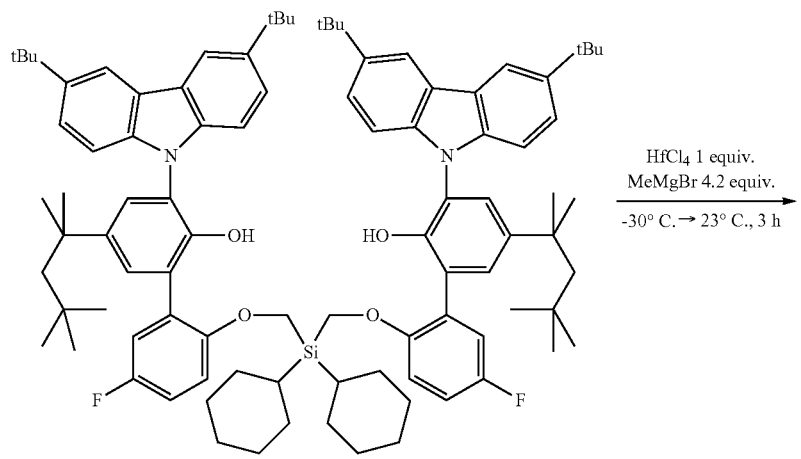

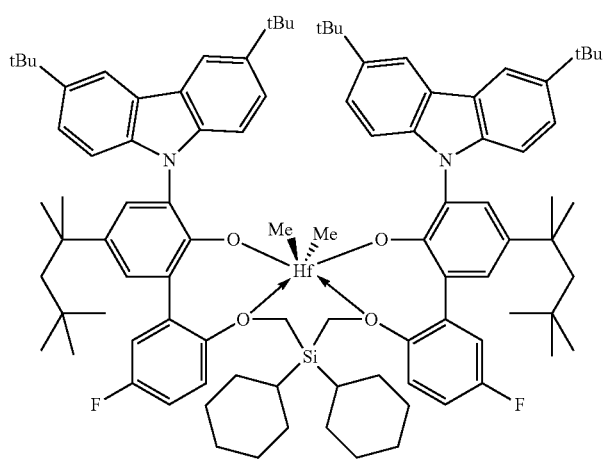

In a glove-box, an oven dried 40 mL vial with a stir bar was charged with HfCl$_4$ (64 mg, 0.2 mmol, 1.0 eq) and anhydrous toluene (6.0 mL). The vial was cooled to −30° C. in a freezer for at least 30 minutes. The vial was removed from the freezer, and MeMgBr (3 M, 0.28 mL, 0.84 mmol, 4.2 eq) was added to the cold stirring suspension. After 10 minutes, 6′,6′′′-(((dicyclohexylsilanediyl)bis(methylene))bis(oxy))bis(3-(3,6-di-tert-butyl-9H-carbazol-9-yl)-3′-fluoro-5-(2,4,4-trimethylpentan-2-yl)-[1,1′-biphenyl]-2-ol) (282 mg, 0.2 mmol, 1.0 eq) was added as solid. The resulting mixture was stirred at room temperature overnight. Solvents were removed under vacuum to yield a dark solid, which was washed with hexanes (10 mL) and then extracted with toluene (12 mL). The toluene extract was dried under vacuum, and 250 mg of a white solid, a 77% yield, was produced.

$^1$H NMR (400 MHz, C$_6$D$_6$) δ 8.63 (d, J=1.9 Hz, 2H), 8.42 (d, J=1.9, 2H), 7.71-7.55 (m, 6H), 7.50-7.38 (m, 6H), 7.08-6.98 (m, 2H), 6.93-6.84 (m, 2H), 5.32 (dd, J=9.1, 4.8 Hz, 2H), 4.28 (d, J=13.8 Hz, 2H), 3.26 (d, J=13.8 Hz, 2H), 1.58-1.29 (m, 66H), 1.11-0.95 (m, 8H), 0.76 (s, 18H), −1.13 (s, 6H).

$^{19}$F{$^1$H} NMR (376 MHz, CDCl$_3$) δ −116.89 (m, 2F).

E-9. Preparation of bis((2-bromo-4-fluorophenoxy)methyl)diisopropylsilane

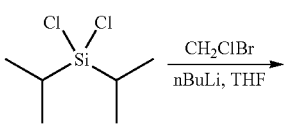

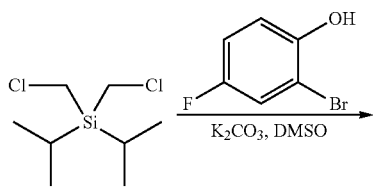

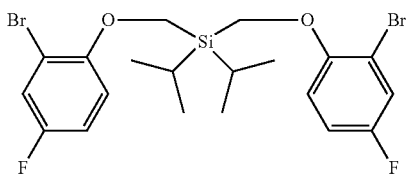

In a glove-box, diisopropyldichlorosilane (3.703 g, 20 mmol, 1.0 eq) was dissolved in anhydrous THF (120 mL) in a 250 mL single-neck round-bottom flask. The flask was capped with a septum, sealed, removed from the glove-box, and cooled to −78° C. in a dry ice-acetone bath. Bromochloromethane (3.9 mL, 60 mmol, 3.0 eq) was added. A solution of n-BuLi (18.4 mL, 46 mmol, 2.3 eq) in hexane was added to the cooled wall of the flask over a period of 3 h using a syringe pump. The mixture was allowed to warm up to room temperature overnight (16 h) and saturated NH$_4$Cl (30 mL) was added. The two layers were separated, and the organic layer was collected. The aqueous layer was extracted with ether (2×50 mL). The combined organic layer was dried over MgSO$_4$, filtered and concentrated under reduced pressure. The crude product was used for the next step without further purification.

A 250 mL round-bottom flask was charged with the above bis(chloromethyl)diisopropylsilane, 2-bromo-4-fluorophenol (11.462 g, 60 mmol, 3.0 eq), K$_2$CO$_3$ (11.058 g, 80 mmol, 4.0 eq), and DMSO (120 mL). The reaction mixture was stirred at 60° C. overnight then at 100° C. for 2 hours. After cooling down to room temperature, the reaction mixture was poured into water to precipitate the product. The resulting emulsion was extracted with DCM. The combined organic layer was dried over MgSO$_4$, filtered, and concentrated by rotary-evaporation. The residue was purified by column chromatography. After two steps, the overall yield was 8.81 g of a colorless oil, which was a 84% yield.

$^1$H NMR (400 MHz, CDCl$_3$) δ 7.29-7.24 (m, 2H), 6.98 (dd, J=6.4, 1.7 Hz, 4H), 3.92 (s, 4H), 1.44-1.32 (m, 2H), 1.20 (d, J=7.4 Hz, 12H).

$^{19}$F{1H} NMR (376 MHz, CDCl$_3$) δ −122.63 (s, 2F).

E-10. Preparation of 6',6"-(((diisopropylsilanediyl)bis(methylene))bis(oxy))bis(3-(3,6-di-tert-butyl-9H-carbazol-9-yl)-3'-fluoro-5-(2,4,4-trimethylpentan-2-yl)-[1,1'-biphenyl]-2-ol)

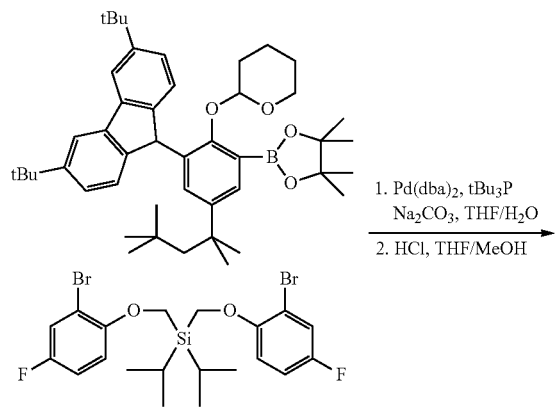

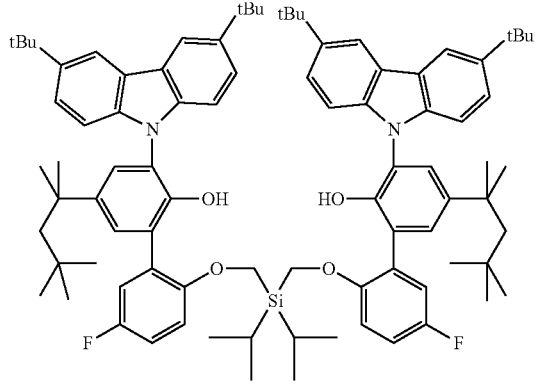

In a glove-box, a 40 mL vial was charged with bis((2-bromo-4-fluorophenoxy)methyl)diisopropylsilane (1.045 g, 2.0 mmol, 1.0 eq), 3,6-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (4.164 g, 6.0 mmol, 3.0 eq), Na$_2$CO$_3$ (1.484 g, 14.0 mmol, 7.0 eq) and degassed THF (12.0 mL). The vial was capped and taken out of the glove-box, and de-ionized water (5.0 mL) was added. Nitrogen gas was purged through the stirred reaction mixture for 5 minutes to ensure complete degassing. A pre-mixed solution of Bis(dibenzylideneacetone)palladium(0) (Pd(dba)2) (Pd(dba)$_2$) (46 mg, 0.08 mmol, 0.04 eq) and t-Bu$_3$P (32 mg, 0.16 mmol, 0.08 eq) in THF (3.0 mL) was then added. The reaction was heated to 70° C. for 18 hours with vigorous stirring. After the reaction solution was cooled to room temperature, the organic layer was transferred to a 100 mL round bottom flask, and the reaction vial was washed with 4.0 mL of THF that was then transferred to the round bottom flask. A mixture of 15 mL of methanol (MeOH) and 1.0 mL of concentrated HCl was added to the round bottom flask, which was then refluxed (80-90° C.) for 2 hours. The reaction mixture was concentrated at a reduced pressure. Water (50 mL) was added and the product was extracted by ether (70 mL×3). The extract was dried over MgSO$_4$ and filtered through a short pad of silica gel. After removing solvents, the residue was purified by crystallization in ether/ethanol solution. A white solid was collected; the reaction yielded 2.42 g, a 91% yield.

$^1$H NMR (400 MHz, CDCl$_3$) δ 8.25 (s, 4H), 7.44-7.35 (m, 4H), 7.33 (d, J=2.5 Hz, 2H), 7.13 (d, J=2.4 Hz, 2H), 6.97 (br s, 4H), 6.81-6.74 (m, 2H), 6.23 (br s, 2H), 5.34 (br s, 2H), 5.22 (s, 2H), 3.27 (br s, 4H), 1.66 (s, 4H), 1.48 (s, 36H), 1.29 (s, 12H), 0.82-0.69 (m, 32H).

$^{19}$F{1H} NMR (376 MHz, CDCl$_3$) δ −124.12 (s, 2F).

E-11. Preparation of Example Catalyst D

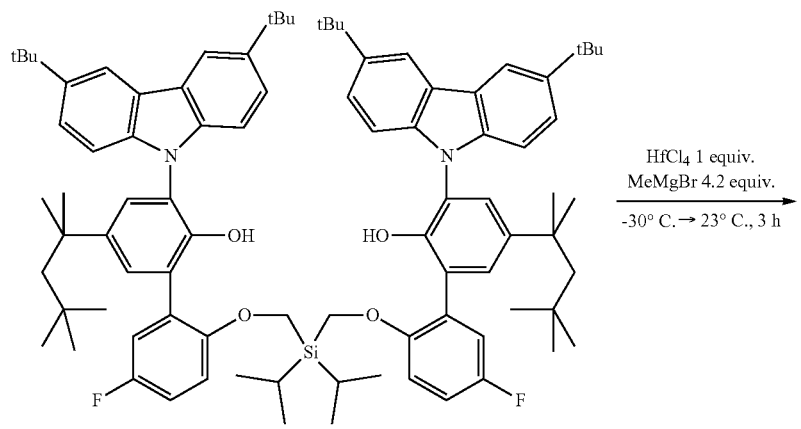

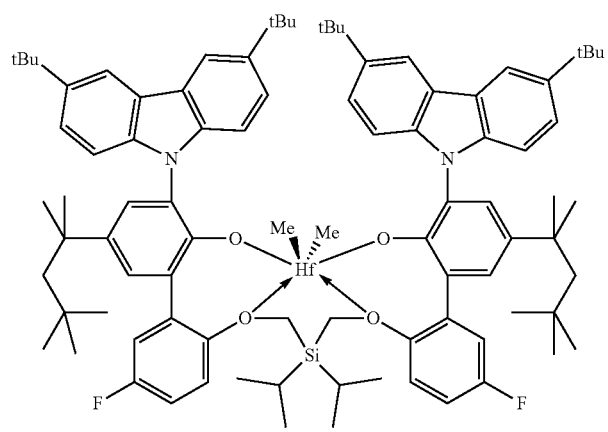

In a glove-box, an oven dried 40 mL vial with a stir bar was charged with HfCl$_4$ (64 mg, 0.2 mmol, 1.0 eq) and anhydrous toluene (6.0 mL). The vial was cooled to −30° C. in a freezer for at least 30 minutes. The vial was removed from the freezer. MeMgBr (3 M, 0.28 mL, 0.84 mmol, 4.2 eq) was added to the stirring suspension. After 10 minutes, 6',6'''-(((diisopropylsilanediyl)bis(methylene))bis(oxy))bis (3-(3,6-di-tert-butyl-9H-carbazol-9-yl)-3'-fluoro-5-(2,4,4-trimethylpentan-2-yl)-[1,1'-biphenyl]-2-ol) (266 mg, 0.2 mmol, 1.0 eq) was added as solid. The resulting mixture was stirred at room temperature overnight. Solvents were removed under vacuum to yield a dark solid, which was extracted with hexanes (12 mL). The extract was concentrated to about 2 mL then kept in the freezer for one day. The solvent was decanted and the white solid was dried under vacuum. The final product was collected as 204 mg of a white solid, a 66% yield.

$^1$H NMR (400 MHz, C$_6$D$_6$) δ 8.64-8.60 (m, 2H), 8.42-8.38 (m, 2H), 7.67-7.47 (m, 8H), 7.45-7.39 (m, 2H), 7.26 (d, J=2.5 Hz, 2H), 7.07 (dd, J=8.9, 3.1 Hz, 3H), 6.84-6.75 (m, 2H), 5.27-5.19 (m, 2H), 4.35 (d, J=14.1 Hz, 2H), 3.29 (d, J=14.1 Hz, 2H), 1.57 (d, J=3.5 Hz, 4H), 1.47 (s, 18H), 1.34-1.19 (m, 30H), 0.80 (s, 18H), 0.58-0.48 (m, 12H), 0.35-0.24 (m, 2H), -1.08 (s, 6H).

$^{19}$F{$^1$H} NMR (376 MHz, CDCl$_3$) δ −116.40 (m, 2F).

E-12. Preparation of 6',6'''-(((diisopropylsilanediyl) bis(methylene))bis(oxy))bis(3-(9H-carbazol-9-yl)-3'-fluoro-5-methyl-[1,1'-biphenyl]-2-ol)

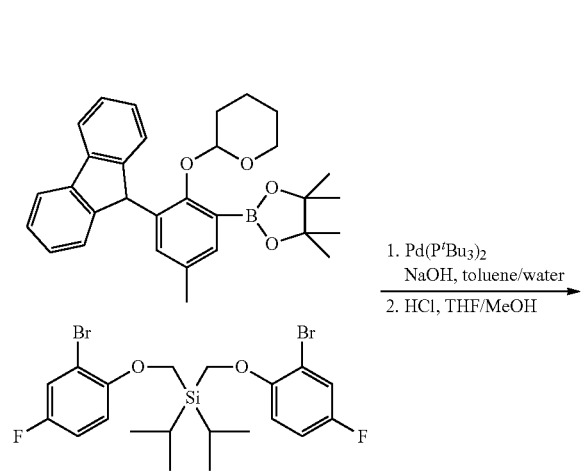

31
-continued

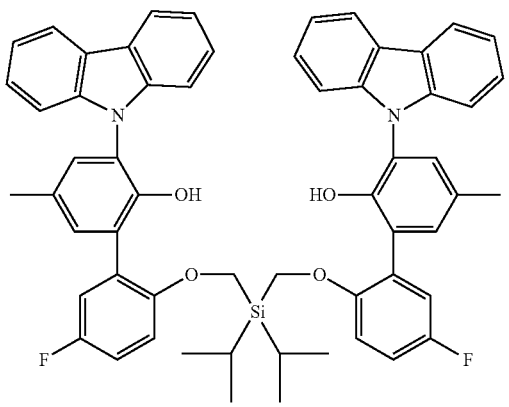

Degassed toluene (14 mL) and degassed water (4 mL) were added to a 100 mL flask charged with 9-(5-methyl-2-((tetrahydro-2H-pyran-2-yl)oxy)-3-(4,4,5,5-tetramethyl-1,3,2-dioxaborolan-2-yl)phenyl)-9H-carbazole (4.51 g, 9.33 mmol, 2.5 eq), bis((2-bromo-4-fluorophenoxy)methyl)diisopropylsilane (1.95 g, 3.73 mmol, 1.0 eq), NaOH (0.747 g, 18.7 mmol, 5.0 eq) and Pd(P$^t$Bu$_3$)$_2$ (0.076 g, 0.149 mmol, 0.04 eq). The reaction was warmed to 80° C. and maintained at this temperature for 18 h. After this time, the reaction was cooled to room temperature. The mixture was transferred to a separatory funnel, and the product was washed with 5 mL of toluene and 10 mL of water. The layers were separated, and the organic layer was collected. The organic layer was washed with brine (10 mL), dried over sodium sulfate, and filtered. To the toluene solution, 10 mL of MeOH and 8 drops of concentrated HCl were added. The mixture was stirred at room temperature for 1 h. After an hour, saturated aqueous NaHCO$_3$ (10 mL) and Et$_2$O (15 mL) were added to the reaction mixture. The mixture was transferred to a separatory funnel and the organic layer was collected. The aqueous phase was further extracted with Et$_2$O (10 mL) and the combined organic extracts were washed with brine (10 mL), dried over sodium sulfate, and filtered. The solvent was removed under reduced pressure. The material was triturated with 10 mL of acetonitrile (CH$_3$CN), and the resulting solid material was isolated by filtration. The filter cake was washed with 5 mL of CH$_3$CN, twice. The product was obtained as a white solid with 2.57 g yield. The mother liquor was placed in a freezer (0° C.) and an additional 0.450 g of product precipitated, which was collected by filtration and washed with CH$_3$CN (5 mL). The final product was isolated as a white solid with a 89% (3.02 g) yield.

$^1$H NMR (400 MHz, CDCl$_3$) δ 8.27-8.15 (m, 4H), 7.38-7.27 (m, 8H), 7.19-7.15 (m, 2H), 7.14-7.08 (m, 4H), 7.04-7.01 (m, 2H), 6.90 (dd, J=8.8, 3.2 Hz, 2H), 6.40 (td, J=8.6, 3.1 Hz, 2H), 5.89-5.72 (m, 2H), 5.40 (s, 2H), 3.40 (s, 4H), 2.31 (s, 6H), 0.88-0.69 (m, 14H);

$^{19}$F NMR (376 MHz, CDCl$_3$) δ −123.67;

32
E-13. Preparation of Example Catalyst E

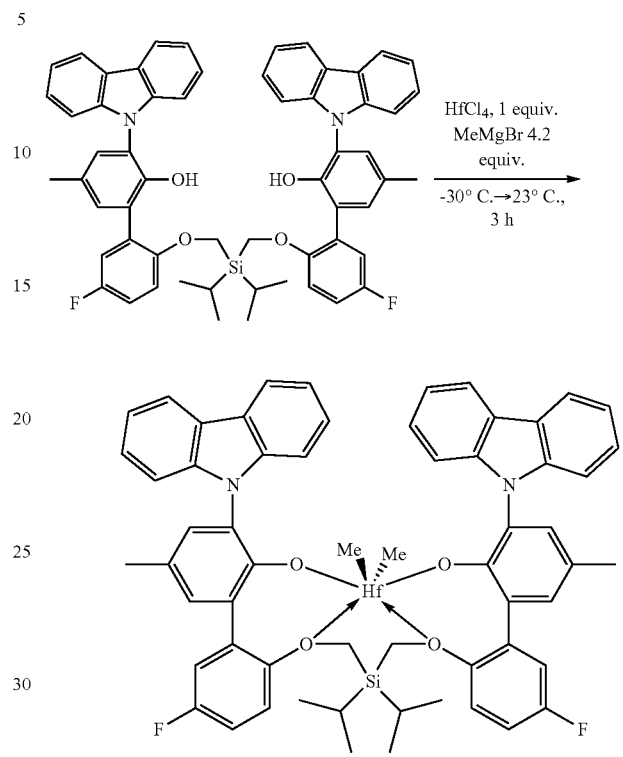

A sample of MeMgBr (3.86 mL, 3M in Et$_2$O) was added to a −30° C. solution of HfCl$_4$ (0.91 g, 2.84 mmol) in CH$_2$Cl$_2$ (40 mL). After stirring for 5 minutes 6',6'''-(((diisopropylsilanediyl)bis(methylene))bis(oxy))bis(3-(9H-carbazol-9-yl)-3'-fluoro-5-methyl-[1,1'-biphenyl]-2-ol) (2.53 g, 2.79 mmol) was added as a solution in CH$_2$Cl$_2$ (10 mL). The mixture was stirred for 6 h, and then the solution was filtered through a pad of CELITE. The pad was washed with CH$_2$Cl$_2$ (20 mL). The pad of CELITE was transferred to a jar, and toluene (30 mL) was added to the jar. This mixture was stirred for 30 minutes. The two solutions of CH$_2$Cl$_2$, that were filtered through the CELITE pad were combined, and the solvent was removed under reduced pressure to produce a brown solid. This material was dissolved in toluene (30 mL) then filtered through a pad of CELITE. The initial CELITE pad/toluene mixture that had been stirring for 30 minutes was then also passed through this pad of CELITE. The pad was washed with toluene (15 mL). The three toluene extracts were combined and the solvent was removed to produce a white semi-solid. This solid was evaporated from hexanes (3×5 mL) to yield 2.97 g (95.6%) of the Example Catalyst E as a white powder.

$^1$H NMR (400 MHz, C$_6$D$_6$) δ 8.16-8.09 (m, 2H), 8.08-8.00 (m, 2H), 7.52-7.46 (m, 2H), 7.46-7.40 (m, 2H), 7.36 (app ddd, J=8.2, 7.2, 1.3 Hz, 2H), 7.29-7.19 (m, 4H), 7.20-7.11 (m, 2H), 7.05-7.02 (m, 2H), 6.88-6.79 (m, 4H), 6.67 (app ddd, J=9.0, 7.3, 3.2 Hz, 2H), 4.91 (dd, J=9.1, 4.8 Hz, 2H), 4.20 (d, J=14.1 Hz, 2H), 3.11 (d, J=14.1 Hz, 2H), 2.07 (s, 6H), 0.43 (app dd, J=7.5, 5.2 Hz, 12H), 0.32-0.16 (m, 2H), −1.16 (s, 6H);

$^{19}$F NMR (376 MHz, C$_6$D$_6$) δ −117.08.

E-14. Preparation of Example Catalyst F

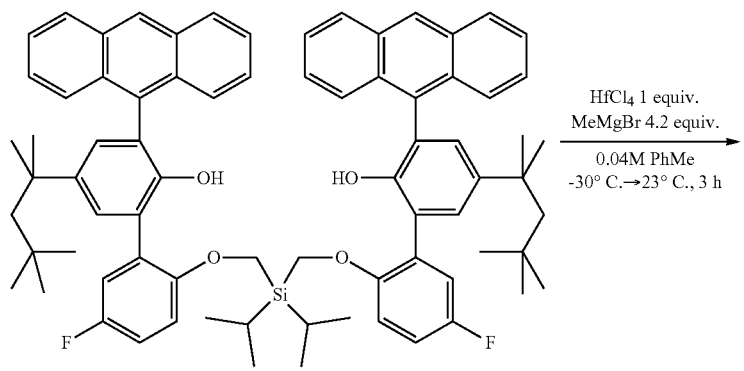

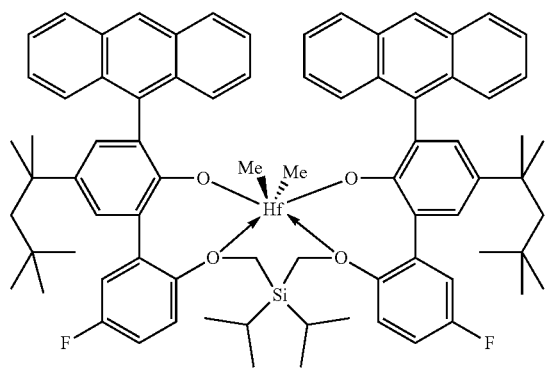

In a glove-box, HfCl₄ (0.057 g, 0.18 mmol) was suspended in 3.25 mL anhydrous toluene in a scintillation vial equipped with a stir bar. The reaction vial was then chilled to −34° C. in the freezer. To the chilled mixture MeMgBr (0.25 mL of 3.0 M solution in diethyl ether, 0.75 mmol) was added and the mixture was stirred. The mixture turned slightly dark after 10 min. 6',6'''-(((diisopropylsilanediyl)bis(methylene))bis(oxy))bis(3-(anthracen-9-yl)-3'-fluoro-5-(2,4,4-trimethylpentan-2-yl)-[1,1'-biphenyl]-2-ol) (0.200 g, 0.18 mmol) was added to the mixture (with 1 mL toluene for rinsing) and stirred for 16 h at 20° C. The presence of Catalyst F in the crude residue was verified by NMR spectroscopy (¹H and ¹⁹F) using deuterated benzene (C₆D₆). The volatiles from the mixture were removed under vacuum and the residue was washed thoroughly with hexanes and separated by vacuum filtration using a pad of CELITE®. The filtrate was concentrated to yield 0.046 g of Catalyst F as a light yellow solid, which is an indication that the material is slightly impure. The residue on the filter/CELITE® was then washed thoroughly with toluene. The filtrate was stored in the glove-box freezer at −34° C., which resulted in the formation of some dark precipitate. The precipitate was separated using a syringe filter. Upon removal of toluene from the filtrate in under reduced pressure, 0.163 g of yellow solid was isolated. The yield of the reaction was ca. 88%.

¹H NMR (400 MHz, C6D6) δ 8.32-8.30 (m, 4H), 8.15-8.13 (m, 2H), 7.97-7.94 (m, 2H), 7.78-7.76 (m, 2H), 7.58-7.57 (m, 2H), 7.35 (m, 2H), 7.31-7.26 (m, 5H), 7.14-7.01 (m, 5H), 6.65-6.60 (m, 2H), 4.58-4.54 (m, 2H), 4.26-4.23 (m, 2H), 3.12-3.08 (m, 2H), 1.61 (s, 4H), 1.31-1.29 (overlapping s, 12H), 0.84 (s, 18H), 0.49-0.40 (m, 2H), 0.63-0.61 (overlapping s, 12H), −1.57 (s, 6H).

¹⁹F NMR (376 MHz, C6D6) δ −117.51.

E-15. Preparation of 6",6""-(((diisopropylsilanediyl)bis(methylene))bis(oxy))bis(3,5-di-tert-butyl-3"-fluoro-5'-methyl-[1,1':3',1"-terphenyl]-2'-ol)

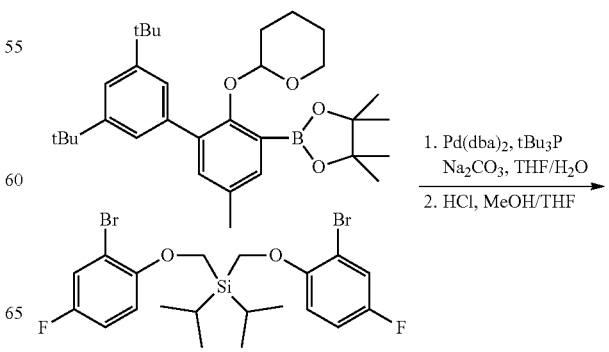

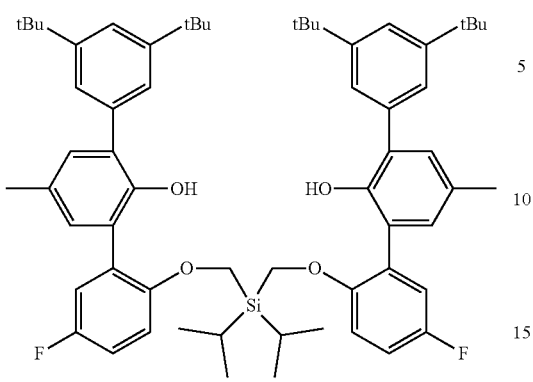

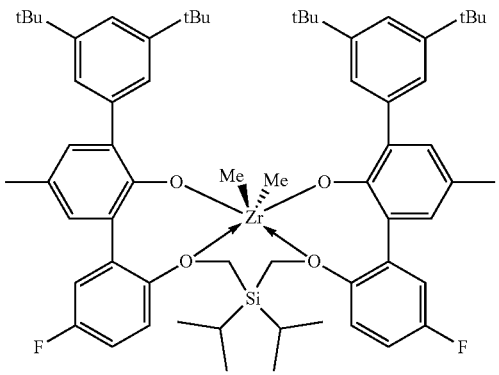

In a glove-box, to a 40 mL vial was added bis((2-bromo-4-fluorophenoxy)methyl)diisopropylsilane (2.09 g, 4.0 mmol, 1.0 eq), 2-(3',5'-di-tert-butyl-5-methyl-2-((tetrahydro-2H-pyran-2-yl)oxy)-[1,1'-biphenyl]-3-yl)-4,4,5,5-tetramethyl-1,3,2-dioxaborolane (6.081 g, 12.0 mmol, 3.0 eq), $Na_2CO_3$, and degassed THF (14 mL). The vial was taken out of the glove-box and water (7 mL) was added. Nitrogen was purged through the stirred solution for 5 min to ensure complete degassing. A premixed solution of $Pd(dba)_2$ (0.092 g, 0.16 mmol, 0.04 eq) and $tBu_3P$ (0.065 g, 0.32 mmol, 0.08 eq) in THF (2 mL) was then added. The reaction was then heated to 70° C. for 18 hours. After solution was cooled to room temperature, the organic layer was transferred to a 100 mL round bottom flask. A mixture of MeOH (15 mL) and concentrated HCl (1.0 mL) were added, and then refluxed (80-90° C.) for 2 hours. The reaction mixture was concentrated. Water (50 mL) was added and the product was extracted by ether (70 mL×3). The extract was dried over MgSO4 and filtered through a short pad of silica gel. After removing solvents, the residue was purified by reverse phase column chromatography. The final product was collected as 3.1 g of a white solid with an 81% yield.

$^1$H NMR (400 MHz, $C_6D_6$) δ 7.45 (t, J=1.8 Hz, 2H), 7.29 (d, J=1.8 Hz, 4H), 7.07 (d, J=2.2 Hz, 2H), 7.00 (dd, J=8.8, 3.1 Hz, 2H), 6.89 (d, J=2.2 Hz, 2H), 6.82-6.75 (m, 2H), 6.61 (dd, J=9.1, 4.5 Hz, 2H), 5.28 (s, 2H), 3.56 (s, 4H), 2.29 (s, 6H), 1.35 (s, 36H), 0.91-0.80 (m, 3H), 0.72 (d, J=7.1 Hz, 12H).

$^{19}F\{1H\}$ NMR (376 MHz, $CDCl_3$) δ −123.87 (m, 2F).

E-16. Preparation of Example Catalyst G

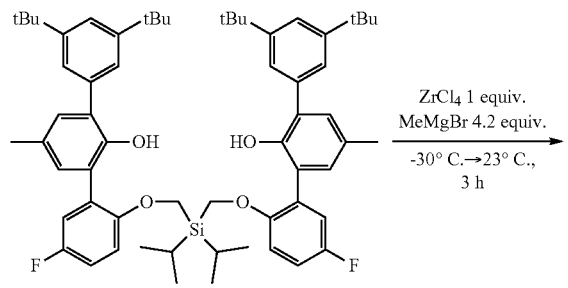

In a glove-box, $ZrCl_4$ (466 mg, 2.0 mmol, 1.0 eq) suspended in 50 mL of anhydrous DCM was added to an oven dried 100 mL bottle with a stir bar. The bottle was cooled to −30° C. in a freezer for at least 30 minutes then removed from the freezer. MeMgBr (3 M, 2.8 mL, 8.4 mmol, 4.2 eq) was added to the stirring suspension. After 2 minutes, 6'',6''''-(((diisopropylsilanediyl)bis(methylene))bis(oxy))bis(3,5-di-tert-butyl-3''-fluoro-5'-methyl-[1,1':3',1''-terphenyl]-2'-ol) (1.907 g, 2.0 mmol, 1.0 eq) was added as solid. The resulting mixture was stirred at room temperature overnight then passed through a plug of CELITE. The plug was washed with $CH_2Cl_2$ (10 mL). Solvent solutions were combined and removed under vacuum to yield a dark solid, which was then washed with ca. 20 mL of hexanes and then extracted with toluene (80 mL). The toluene extract was dried under vacuum, and 1.75 g of a white solid was collected, resulting in a 82% yield.

$^1$H NMR (400 MHz, $C_6D_6$) δ 8.23-7.88 (brs, 2H), 7.67-7.63 (m, 2H), 7.19 (d, J=2.4 Hz, 2H), 7.15-7.09 (m, 2H), 7.09-6.98 (m, 6H), 6.86-6.77 (m, 4H), 5.52 (dd, J=9.0, 4.8 Hz, 2H), 4.53 (d, J=13.6 Hz, 2H), 3.34 (d, J=13.6 Hz, 2H), 2.11 (s, 6H), 1.37 (brs, 36H), 0.50-0.46 (m, 12H), 0.19-0.08 (m, 2H), 0.04 (s, 6H).

$^{19}F\{1H\}$ NMR (376 MHz, $CDCl_3$) δ −116.63 (m, 2F).

E-17. Preparation of bis((2-bromo-4-fluorophenoxy)methyl)di-tert-butylsilane

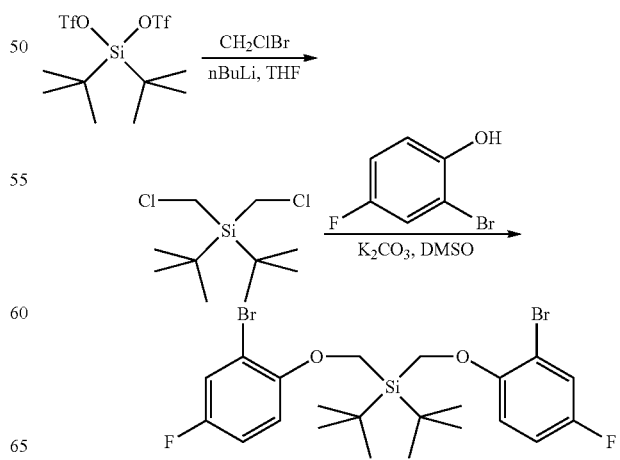

In a glove-box, di-t-butylsilyl ditriflate (4.41 g, 10.0 mmol, 1.0 eq) was dissolved in anhydrous THF (50 mL) in a 250 mL single-neck round-bottom flask. The flask was capped with a septum, sealed, taken out of the glove-box, and cooled to −78° C. in a dry ice-acetone bath. Bromochloromethane (1.95 mL, 30 mmol, 3.0 eq) was added. A solution of n-BuLi (9.2 mL, 23.0 mmol, 2.3 eq) in hexane was added to the cooled wall of the flask over a period of 3 h using a syringe pump. The mixture was allowed to warm up to room temperature overnight (16 h) and saturated NH$_4$Cl (30 mL) was added. The two layers were separated. The aqueous layer was extracted with ether (2×50 mL). The combined organic layers were dried over MgSO$_4$, filtered and concentrated under reduced pressure. The crude product was used for the next step without further purification.

A 100 mL round bottom flask was charged with the above di-tert-butylbis(chloromethyl)silane, 2-bromo-4-fluorophenol (5.73 g, 30 mmol, 3.0 eq), K$_2$CO$_3$ (5.53 g, 40 mmol, 4.0 equiv), and DMSO (50 mL). The reaction mixture was stirred at 60° C. overnight then at 100° C. for 2 hours. Only mono-substituted product was observed by GC-MS. More phenol (3.5 g, 18 mmol, 1.8 eq) and K$_2$CO$_3$ (3.5 g, 25 mmol, 2.5 eq) were added, and the reaction mixture was heated at 120° C. for another 24 hours. After the reaction mixture was cooled to room temperature, it was poured into water to precipitate the product. The resulting emulsion was extracted with DCM. The combined organic layer was dried over MgSO$_4$, filtered, and concentrated by reduced pressure. The residue was purified by column chromatography, and 1.32 g of a colorless oil was collected that resulted in a 24% yield.

$^1$H NMR (400 MHz, CDCl$_3$) δ 7.30-7.27 (m, 2H), 7.02-6.98 (m, 4H), 3.95 (s, 4H), 1.22 (s, 18H).

$^{19}$F{1H} NMR (376 MHz, CDCl$_3$) δ −122.68 (s, 2F).

E-18. Preparation of 6',6'''-(((di-tert-butylsilanediyl)bis(methylene))bis(oxy))bis(3-(3,6-di-tert-butyl-9H-carbazol-9-yl)-3'-fluoro-5-(2,4,4-trimethylpentan-2-yl)-[1,1'-biphenyl]-2-ol)

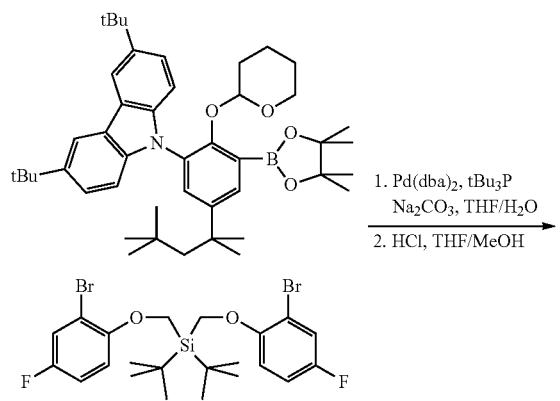

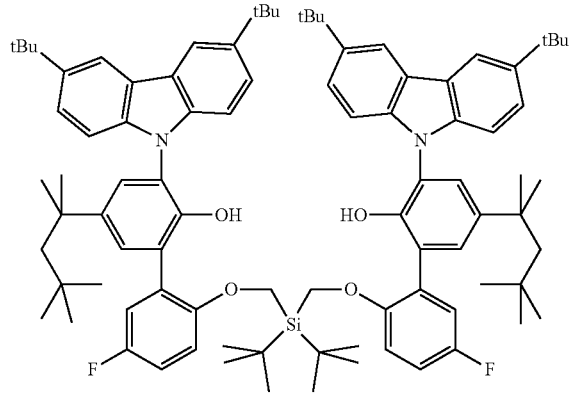

In a glove-box, a 40 mL vial was charged with bis((2-bromo-4-fluorophenoxy)methyl)di-tert-butylsilane (1.1 g, 2.0 mmol, 1.0 eq), 3,6-di-tert-butyl-9-(2-((tetrahydro-2H-pyran-2-yl)oxy)-3-(4,4,5,5-tetramethyl-1,3,2-dioxaborolan-2-yl)-5-(2,4,4-trimethylpentan-2-yl)phenyl)-9H-carbazole (4.164 g, 6.0 mmol, 3.0 eq), Na$_2$CO$_3$ (1.484, 14.0 mmol, 7.0 eq) and degassed THF (12.0 mL). The vial was capped and removed from the glove-box, and de-ionized water (5.0 mL) was added. Nitrogen gas was purged through the stirred reaction mixture for 5 min to ensure complete degassing. A pre-mixed solution of Pd(dba)$_2$ (46 mg, 0.08 mmol, 0.04 eq) and tBu$_3$P (32 mg, 0.16 mmol, 0.08 eq) in THF (3.0 mL) was then added. The reaction was heated to 70° C. for 18 hours with vigorous stirring. After the reaction mixture was cooled to room temperature, the organic layer was transferred to a 100 mL round bottom flask. The reaction vial was rinsed with THF (4 mL) and transferred to the round bottom flask. MeOH (15 mL) and concentrated HCl (1.0 mL) were added, and the solution was refluxed (80-90° C.) for 2 hours. The reaction mixture was concentrated by rotary-evaporation. Water (50 mL) was added and the product was extracted by ether (70 mL×3). The extract was dried over MgSO$_4$ and filtered through a short pad of silica gel. After removing solvents, the residue was purified by crystallization in ether/ethanol. The reaction produced 2.15 g of a white solid, which was a 79% yield.

$^1$H NMR (400 MHz, CDCl$_3$) δ 8.25 (br s, 4H), 7.51-7.27 (m, 6H), 7.22-7.02 (m, 4H), 6.95-6.65 (m, 4H), 6.12 (br s, 2H), 5.29 (s, 2H), 5.20 (br s, 2H), 3.58 (br s, 2H), 3.02 (br s, 2H), 1.63 (s, 4H), 1.54-1.43 (m, 36H), 1.28 (s, 12H), 0.80-0.66 (m, 36H).

$^{19}$F{1H} NMR (376 MHz, CDCl$_3$) δ −124.18 (s, 2F).

E-19. Preparation of Example Catalyst H

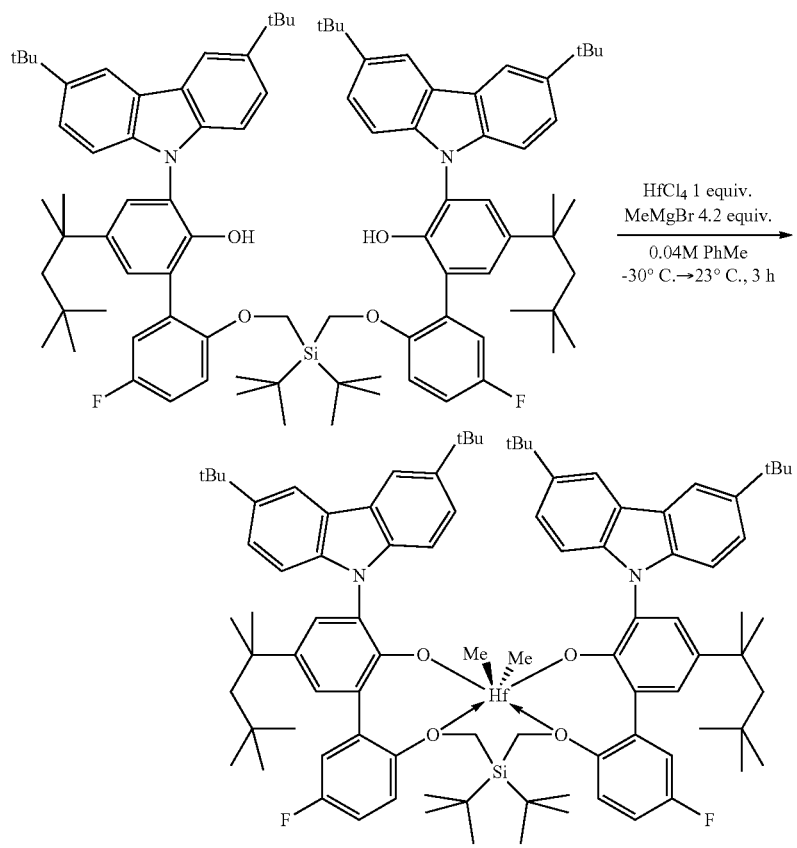

In a glove-box, an oven dried 40 mL vial with a stir bar was charged with HfCl$_4$ (64 mg, 0.2 mmol, 1.0 eq) and anhydrous toluene (6.0 mL). The vial was cooled to −30° C. in a freezer for at least 30 minutes. The vial was taken out of the freezer. MeMgBr (3 M, 0.28 mL, 0.84 mmol, 4.2 eq) was added to the stirring suspension. After 10 minutes, 6′,6′′′-(((di-tert-butylsilanediyl)bis(methylene))bis(oxy))bis (3-(3,6-di-tert-butyl-9H-carbazol-9-yl)-3′-fluoro-5-(2,4,4-trimethylpentan-2-yl)-[1,1′-biphenyl]-2-ol) (272 mg, 0.2 mmol, 1.0 eq) was added as solid. The resulting mixture was stirred at room temperature overnight. Solvents were removed under vacuum to yield a dark solid, which was extracted with hexanes (12 mL). The extract was concentrated to about 2 mL then kept in the freezer for one day. The solvent was decanted and the white solid was dried under vacuum, and 253 mg of a white solid was collected, resulting in a 81% yield.

$^1$H NMR (400 MHz, C$_6$D$_6$) δ 8.63-8.59 (m, 2H), 8.45-8.40 (m, 2H), 7.65-7.53 (m, 6H), 7.44-7.39 (m, 4H), 7.22 (d, J=2.5 Hz, 2H), 7.13 (dd, J=8.9, 3.2 Hz, 3H), 7.03-6.94 (m, 2H), 5.30-5.22 (m, 2H), 4.10 (d, J=13.5 Hz, 2H), 3.06 (d, J=13.5 Hz, 2H), 1.59 (s, 4H), 1.47 (s, 18H), 1.39-1.25 (m, 30H), 0.83 (s, 18H), 0.54 (s, 18H), −1.24 (s, 6H).

$^{19}$F{1H} NMR (376 MHz, CDCl$_3$) δ −117.92 (m, 2F).

Procedure for Batch Reactor Polymerization

Raw materials (ethylene, 1-octene) and the process solvent (a narrow boiling range high-purity isoparaffinic solvent trademarked ISOPAR E commercially available from ExxonMobil Corporation) were purified with molecular sieves before introduction into the reaction environment. A one gallon (3.79 L) stirred autoclave reactor was charged with ISOPAR E, and 1-octene. The reactor was then heated to the desired temperature and charged with ethylene to bring the total pressure to ca 420 psig. The catalyst composition was prepared in a drybox under inert atmosphere by mixing the desired pro-catalyst and a co-catalyst ([HNMe (C$_{18}$H$_{37}$)$_2$][B(C$_6$F$_5$)$_4$] along with modified methylaluminoxane (MMAO), with additional solvent to give a total volume of about 15-20 mL. The activated catalyst mixture was then quick-injected into the reactor. The reactor pressure and temperature were kept constant by feeding ethylene during the polymerization and cooling the reactor as needed. After 10 minutes, the ethylene feed was shut off and the solution transferred into a nitrogen-purged resin kettle. The polymer was thoroughly dried in a vacuum oven, and the reactor was thoroughly rinsed with hot ISOPAR E between polymerization runs.

Procedure for Miniplant Polymerization

Raw materials (ethylene, 1-octene) and the process solvent (a narrow boiling range high-purity isoparaffinic solvent trademarked Isopar E commercially available from ExxonMobil Corporation) are purified with molecular sieves before introduction into the reaction environment. Hydrogen is supplied in pressurized cylinders as a high purity grade and is not further purified. The reactor monomer feed (ethylene) stream is pressurized via mechanical compressor to above reaction pressure at 525 psig. The solvent and comonomer (1-octene) feed is pressurized via mechanical positive displacement pump to above reaction pressure at 525 psig. MMAO, commercially available from AkzoNobel, was used as an impurity scavenger. The individual catalyst components (procatalyst cocatalyst) were manually batch diluted to specified component concentrations with purified solvent (Isopar E) and pressured to above reaction pressure at 525 psig. The cocatalyst is [HNMe(C$_{18}$H$_{37}$)$_2$][B(C$_6$F$_5$)$_4$], commercially available from Boulder Scientific, and was used at a 1.2 molar ratio relative to the procatalyst. All reaction feed flows were measured with mass flow meters and independently controlled with computer automated valve control systems.

The continuous solution polymerizations were carried out in a 5 liters (L) continuously stirred-tank reactor (CSTR). The reactor has independent control of all fresh solvent, monomer, comonomer, hydrogen, and catalyst component feeds. The combined solvent, monomer, comonomer and hydrogen feed to the reactor is temperature controlled to anywhere between 5° C. to 50° C. and typically 25° C. The fresh comonomer feed to the polymerization reactor is fed in with the solvent feed. The fresh solvent feed is controlled typically with each injector receiving half of the total fresh feed mass flow. The cocatalyst is fed based on a calculated specified molar ratio (1.2 molar equivalents) to the procatalyst component. Immediately following each fresh injection location, the feed streams are mixed with the circulating polymerization reactor contents with static mixing elements. The effluent from the polymerization reactor (containing solvent, monomer, comonomer, hydrogen, catalyst components, and molten polymer) exits the first reactor loop and passes through a control valve (responsible for maintaining the pressure of the first reactor at a specified target). As the stream exits the reactor it is contacted with water to stop the reaction. In addition, various additives such as anti-oxidants, could be added at this point. The stream then went through another set of static mixing elements to evenly disperse the catalyst kill and additives.

Following additive addition, the effluent (containing solvent, monomer, comonomer, hydrogen, catalyst components, and molten polymer) passed through a heat exchanger to raise the stream temperature in preparation for separation of the polymer from the other lower boiling reaction components. The stream then entered a two stage separation and devolatization system where the polymer was removed from the solvent, hydrogen, and unreacted monomer and comonomer. The separated and devolatized polymer melt was pumped through a die specially designed for underwater pelletization, cut into uniform solid pellets, dried, and transferred into a box for storage.

As described in the preceding paragraphs Comparative Catalyst A, (Comp. A) Catalyst B, Catalyst C, Catalyst D, Catalyst E, Catalyst F, Catalyst G, and Catalyst H were individually reacted using the polymerization conditions in a single reactor system. Properties for the resulting polymers are reported in Tables 1 and 2.

TABLE 1

Batch reactor polymerization data

| Catalyst | R = —CH$_3$ or —CH$_2$— | Efficiency | T$_C$ | T$_m$ | density | MWD | Mw |
|---|---|---|---|---|---|---|---|
| Comp. A | R$_{17}$, R$_{20}$ | 1,180,000 | 79.7 | 94.4 | 0.8940 | 3.48 | 782,740 |
| Catalyst B | R$_{17}$, R$_{18}$, R$_{20}$, R$_{21}$ | 1,080,000 | 79.5 | 90.8 | 0.8913 | 2.57 | 847,060 |
| Catalyst C | R$_{17}$, R$_{18}$, R$_{20}$, R$_{21}$ | 150,000 | 78.5 | 90.5 | 0.8927 | 2.07 | 807,245 |
| Catalyst D | R$_{17}$, R$_{18}$, R$_{20}$, R$_{21}$ | 1,090,000 | 73.0 | 88.2 | 0.8901 | 2.28 | 847,960 |
| Catalyst E | R$_{17}$, R$_{18}$, R$_{20}$, R$_{21}$ | 250,000 | 73.2 | 82.2 | 0.8888 | 2.35 | 623,428 |
| Catalyst F | R$_{17}$, R$_{18}$, R$_{20}$, R$_{21}$ | 630,000 | 77.4 | 92.7 | 0.8939 | 2.05 | 481,697 |
| Catalyst G | R$_{17}$, R$_{18}$, R$_{20}$, R$_{21}$ | 450,000 | 85.6 | 97.3 | 0.8974 | 2.15 | 672,015 |
| Catalyst H | R$_{17}$, R$_{18}$, R$_{19}$, R$_{20}$, R$_{21}$, R$_{22}$ | 160,000 | 86.7 | 97.7 | 0.8966 | 2.42 | 1,132,740 |

Polymerization conditions: 1325 mL Isopar-E; 100 g octene; temperature = 160° C.; ethylene pressure = 420 psi; precatalyst:activator = 1:1.2; activator = [HNMe(C$_{18}$H$_{37}$)$_2$][B(C$_6$F$_5$)$_4$]; MMAO:Hf = 50:1; reaction time = 10 min. Efficiency is defined in units of grams of polymer per gram of active metal (i.e., Hf or Zr)

TABLE 2

Miniplant Polymerization Data

| Catalyst | Temp ° C. | Efficiency (MM) | MI | H2 (mol %) | I10/I2 | MWD | C8/olefin | T$_M$ ° C. | Density | C8 (mol %) |
|---|---|---|---|---|---|---|---|---|---|---|
| Comp. A | 150 | 6.8 | 0.37 | 0.91 | 8.06 | 2.40 | 37 | 96 | 0.8967 | 6.0 |
| Catalyst D | 165 | 6.9 | 0.30 | 1.26 | 6.40 | 1.99 | 39 | 91.9 | 0.8945 | 5.6 |
| Catalyst G | 150 | 1.2 | 0.31 | 0.19 | 6.55 | — | 34 | — | 0.8973 | — |

Efficiency is defined in units of 10$^6$ grams polymer per gram of active metal (Hf or Zr). C8/olefin is defined as: (moles 1-octene/(total moles 1-octene and ethylene)) × 100.

Comparative Catalyst A (Comp. A), Catalysts B-D, and H had the same general structure without the only variation found in the silyl bridge. Comp. A had ethyl substituents on the silyl bridge; Catalyst B had cyclopentyl substituents; Catalyst C had cyclohexyl substituents; Catalyst D had isopropyl substituents; and H had tert-butyl substituents on the silyl bridge.

The best results were obtained with secondary alkyl substituents. Particularly, the di-isopropylsilyl-bridged (i.e. Catalysts D-G) catalysts allowed a unique combination of most desirable properties featuring excellent efficiency, good 1-octene incorporation, high molecular weight building capability, narrow MWD, narrow short chain branching distribution, low melt flow ratio, and high temperature operability.

Individually, each of the isopropylsilyl-bridged catalysts has one or more of the desirable properties mentioned in the preceding paragraph, but the polymers produced with Catalyst D overall incorporated more of desirable properties than the other catalysts. An important property was the narrow molecular weight distribution or the polydispersity indices (PDI). Catalysts C, D, F, and G all had low PDI that were calculated to be less than 2.3, which indicates single-site behavior. Catalyst D had the best efficiency and greatest molecular weight.

In both the miniplant polymerization (Table 2) and the batch reactor polymerization (Table 1) studies, Catalyst D was more efficient, incorporated a greater mole percent of the additional α-olefin, yielded polymers with a better MWD, and polymers that had a lower melt flow ratio than the other polymers studied.

In the tables (Table 1 and Table 2), "MI" means the melt index, $I_2$, at 190° C. and 2.16 kg load; "C8/olefin" means a molar ratio between the octene and total amount of ethylene.

Measurement Standards:

Density

Samples that are measured for density are prepared according to ASTM D-1928. Measurements are made within one hour of sample pressing using ASTM D-792, Method B.

Melt Index

Melt index ($I_2$) is measured in accordance with ASTM-D 1238, Condition 190° C./2.16 kg, and is reported in grams eluted per 10 minutes. Melt flow rate ($I_{10}$) is measured in accordance with ASTM-D 1238, Condition 190° C./10 kg, and is reported in grams eluted per 10 minutes.

Octene Content

The mole % (mol %) of 1-octene within each sample was determined by taking a ratio of the $CH_3$ area (1382.7-1373.5 wavenumbers) to the $CH_2$ area (1525-1400 wavenumbers) and normalizing to a standard curve generated through NMR analysis of ethylene-co-1-octene polymer standards.

Crystallization Elution Fraction

Comonomer distribution analysis is performed with Crystallization Elution Fractionation (CEF) (PolymerChar in Spain) (B Monrabal et al, Macromol. Symp. 257, 71-79 (2007)). Ortho-dichlorobenzene (ODCB) with 600 ppm antioxidant butylated hydroxytoluene (BHT) is used as solvent. Sample preparation is done with autosampler at 160° C. for 2 hours under shaking at 4 mg/ml (unless otherwise specified). The injection volume is 300 µl. The temperature profile of CEF is: crystallization at 3° C./min from 110° C. to 30° C., the thermal equilibrium at 30° C. for 5 minutes, elution at 3° C./min from 30° C. to 140° C. The flow rate during crystallization is at 0.052 ml/min. The flow rate during elution is at 0.50 ml/min. The data is collected at one data point/second.

CEF column is packed by the Dow Chemical Company with glass beads at 125 µm±6% (MO-SCI Specialty Products) with ⅛ inch stainless tubing. Glass beads are acid washed by MO-SCI Specialty with the request from the Dow Chemical Company. Column volume is 2.06 mL. Column temperature calibration is performed by using a mixture of NIST Standard Reference Material Linear polyethylene 1475a (1.0 mg/ml) and Eicosane (2 mg/ml) in ODCB. Temperature is calibrated by adjusting elution heating rate so that NIST linear polyethylene 1475a has a peak temperature at 101.0° C., and Eicosane has a peak temperature of 30.0° C. The CEF column resolution is calculated with a mixture of NIST linear polyethylene 1475a (1.0 mg/ml) and hexacontane (Fluka, purum, ≥97.0%, 1 mg/ml).

Gel Permeation Chromatography (GPC)

The ethylene/alpha-olefin interpolymers were tested for their properties via GPC, according to the following procedure. The GPC system consists of a Waters (Milford, Mass.) 150° C. high temperature chromatograph (other suitable high temperatures GPC instruments include Polymer Laboratories (Shropshire, UK) Model 210 and Model 220) equipped with an on-board differential refractometer (RI). Additional detectors can include an IR4 infra-red detector from Polymer ChAR (Valencia, Spain), Precision Detectors (Amherst, Mass.) 2-angle laser light scattering detector Model 2040, and a Viscotek (Houston, Tex.) 150R 4-capillary solution viscometer. A GPC with the last two independent detectors and at least one of the first detectors is sometimes referred to as "3D-GPC", while the term "GPC" alone generally refers to conventional GPC. Depending on the sample, either the 15-degree angle or the 90-degree angle of the light scattering detector is used for calculation purposes. Data collection is performed using Viscotek TriSEC software, Version 3, and a 4-channel Viscotek Data Manager DM400. The system is also equipped with an on-line solvent degassing device from Polymer Laboratories (Shropshire, UK). Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of butylated hydroxytoluene (BHT). Both solvents are sparged with nitrogen. The polyethylene samples are gently stirred at 160° C. for four hours (4 h). The injection volume is 200 microliters (µL). The flow rate through the GPC is set at 1 mL/minute.

Measurement for Efficiency

The catalytic efficiency is measured in terms of amount of polymer produced relative to the amount catalyst used in solution polymerization process, wherein the polymerization temperature is at least 130° C.

The GPC column set is calibrated before running the Examples by running twenty-one narrow molecular weight distribution polystyrene standards. The molecular weight (Mw) of the standards ranges from 580 to 8,400,000 grams per mole (g/mol), and the standards are contained in 6 "cocktail" mixtures. Each standard mixture has at least a decade of separation between individual molecular weights. The standard mixtures are purchased from Polymer Laboratories (Shropshire, UK). The polystyrene standards are prepared at 0.025 g in 50 mL of solvent for molecular weights equal to or greater than 1,000,000 g/mol and 0.05 g in 50 ml of solvent for molecular weights less than 1,000,000 g/mol. The polystyrene standards were dissolved at 80° C. with gentle agitation for 30 minutes. The narrow standards mixtures are run first and in order of decreasing highest molecular weight (Mw) component to minimize degradation. The polystyrene standard peak molecular weights are converted to polyethylene Mw using the Mark-Houwink K and a (sometimes referred to as a) values mentioned later for It should be apparent to those skilled in the art that various modifications can be made to the described embodiments without departing from the spirit and scope of the claimed subject matter. Thus, it is intended that the specification cover modifications and variations of the described embodiments provided such modification and variations come within the scope of the appended claims and their equivalences.

The invention claimed is:

1. A polymerization process for producing an ethylene-based polymer comprising:

polymerizing ethylene and at least one additional α-olefin in the presence of a catalyst system, wherein the catalyst system comprises a pro-catalyst defined by the metal ligand complex of formula (I):

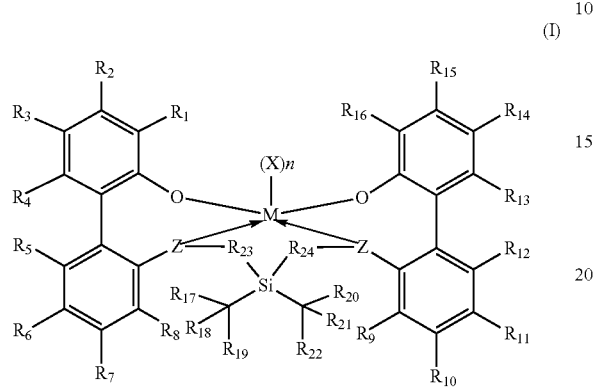

(I)

where:

M is titanium, zirconium, or hafnium, each independently being in a formal oxidation state of +2, +3, or +4; and n is an integer of from 0 to 3, and wherein when n is 0, X is absent; and each X independently is a monodentate ligand that is neutral, monoanionic, or dianionic; or two Xs are taken together to form a bidentate ligand that is neutral, monoanionic, or dianionic;

the metal ligand complex of formula (I) is, overall, neutral;

each Z independently is O;

$R_{1-7}$ and $R_{10-16}$ are selected from the group consisting of a $(C_1-C_{40})$hydrocarbyl, $(C_1-C_{40})$heterohydrocarbyl, —Si($R^C$)$_3$, halogen atom, hydrogen atom, and combinations thereof;

$R_8$ and $R_9$ are hydrogen atoms;

$R_{23}$ and $R_{24}$ are —CH$_2$—;

$R_{17-22}$ are independently selected from a hydrogen atom and a $(C_1-C_{40})$hydrocarbyl, wherein the sum of the non-hydrogen atoms for $R_{17-19}$ is larger than 1, and/or the sum of the non-hydrogen atoms for $R_{20-22}$ is larger than 1 and optionally two or more groups selected from $R_{17-22}$ can combine together to form a ring structure, with such ring structures having from 3 to 50 atoms in the ring, excluding any hydrogen atoms;

at least one of $R_1$ and $R_{16}$ or both of $R_1$ and $R_{16}$ radicals selected from formula (II), formula (III), and formula (IV):

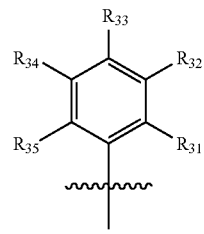

II

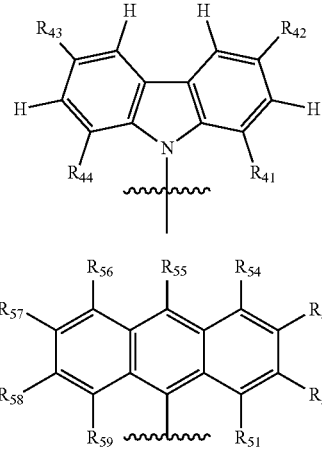

III

IV

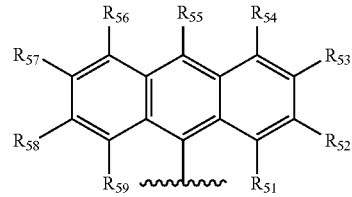

$R_{31-35}$, $R_{41-44}$, and $R_{51-59}$ are independently chosen from a $(C_1-C_{40})$hydrocarbyl, $(C_1-C_{40})$heterohydrocarbyl, —Si($R^C$)$_3$, halogen atom, hydrogen atom, and combinations thereof; and each $R^C$ is independently selected from $(C_1-C_{30})$hydrocarbyl.

2. The polymerization process according claim 1, wherein the catalyst system further comprises at least one cocatalyst.

3. The polymerization process according to claim 1, wherein $R_1$ and $R_{16}$ are the same.

4. The polymerization process according to claim 1, wherein (1) two of $R_{17-19}$ and two of $R_{20-22}$ are members in a $C_5$-$C_6$ cycloalkyl ring structure or (2) two of $R_{17-19}$ or two of $R_{20-22}$ are members in a $C_5$-$C_6$ cycloalkyl ring structure.

5. The polymerization process according to claim 1, wherein at least one of $R_1$ and $R_{16}$ is formula (III) and at least one $R_{42}$ and $R_{43}$ is tert-butyl.

6. The polymerization process according to claim 1, wherein at least one of $R_1$ and $R_{16}$ is formula (III) and $R_{41}$ and $R_{44}$ are hydrogen atoms.

7. The polymerization process according to claim 1, wherein at least one of $R_1$ and $R_{16}$ is formula (IV).

8. The polymerization process according to claim 1, wherein two of $R_{17-19}$ or two of $R_{20-22}$ are methyl groups.

9. The polymerization process according to claim 1, wherein two of $R_{17-19}$ and two of $R_{20-22}$ are methyl groups.

10. The polymerization process according to claim 1, wherein two of $R_{17-19}$ and two of $R_{20-22}$ are not hydrogen atoms.

* * * * *